United States Patent [19]
Feldstein

[11] Patent Number: 5,493,196
[45] Date of Patent: Feb. 20, 1996

[54] BATTERY CHARGER FOR CHARGING ALKALINE ZINC/MANGANESE DIOXIDE CELLS

[75] Inventor: Robert S. Feldstein, Pelham Manor, N.Y.

[73] Assignee: Batonex, Inc., Buffalo, N.Y.

[21] Appl. No.: 27,386

[22] Filed: Mar. 8, 1993

Related U.S. Application Data

[63] Continuation-in-part of Ser. No. 950,066, Sep. 23, 1992, Pat. No. 5,291,116, which is a continuation-in-part of Ser. No. 826,002, Jan. 27, 1992, Pat. No. 5,304,914.

[51] Int. Cl.⁶ ..................................................... H02J 7/04
[52] U.S. Cl. .......................................... 320/3; 320/39/48
[58] Field of Search ................................. 320/4, 3, 5, 6, 320/15, 16, 17, 18, 13, 14, 21, 22, 23, 24, 35, 36, 39, 40, 2, 48

[56] References Cited

U.S. PATENT DOCUMENTS

| | | | |
|---|---|---|---|
| 3,614,583 | 10/1971 | Burkett et al. | 320/5 |
| 3,623,139 | 11/1971 | Dickerson | 320/22 |
| 3,917,990 | 11/1975 | Sherman, Jr. | 320/35 |
| 3,997,888 | 12/1976 | Kremer | 320/48 X |
| 4,061,955 | 12/1977 | Thomas et al. | 320/15 X |
| 4,086,524 | 4/1978 | Kremer | 320/48 X |
| 4,238,721 | 12/1980 | DeLuca et al. | 320/22 X |
| 4,302,714 | 11/1981 | Yefsky | 320/5 |
| 4,385,269 | 5/1983 | Aspinwall et al. | 320/21 X |
| 4,413,221 | 11/1983 | Benjamin et al. | 320/48 |
| 4,614,905 | 9/1986 | Petersson et al. | 320/23 X |
| 4,616,170 | 10/1986 | Urstoger | 320/5 |
| 4,740,739 | 4/1988 | Quammen et al. | 320/21 X |
| 4,829,225 | 5/1989 | Podrazhansky et al. | 320/21 X |
| 5,003,244 | 3/1991 | Davis, Jr. | 320/17 |
| 5,124,627 | 6/1992 | Okada | 320/48 X |
| 5,196,779 | 3/1993 | Alexandres et al. | 320/14 |
| 5,291,116 | 3/1994 | Feldstein | 320/4 |

FOREIGN PATENT DOCUMENTS

| | | | |
|---|---|---|---|
| WO7901061 | 12/1979 | WIPO | 320/3 |
| WO8101488 | 5/1981 | WIPO | 320/3 |

*Primary Examiner*—Peter S. Wong
*Assistant Examiner*—Edward Tso
*Attorney, Agent, or Firm*—Howard M. Cohn

[57] ABSTRACT

A battery charger for charging alkaline zinc/manganese dioxide cells is disclosed.

The battery charger contains means for producing a direct current voltage at 25 degrees centigrade of from about 1.6 to about 1.7 volt as well as means for individually and independently limiting the voltage delivered by the battery charger to each of the cells. The charger also contains means for individually and independently limiting the current applied to each of said cells by said battery charger as well as means for individually and continuously varying the current applied to each of said cells.

Once any of the cells in the charge has reached its desired voltage, the charger reduces the current supplied to said cell substantially to zero current.

6 Claims, 8 Drawing Sheets

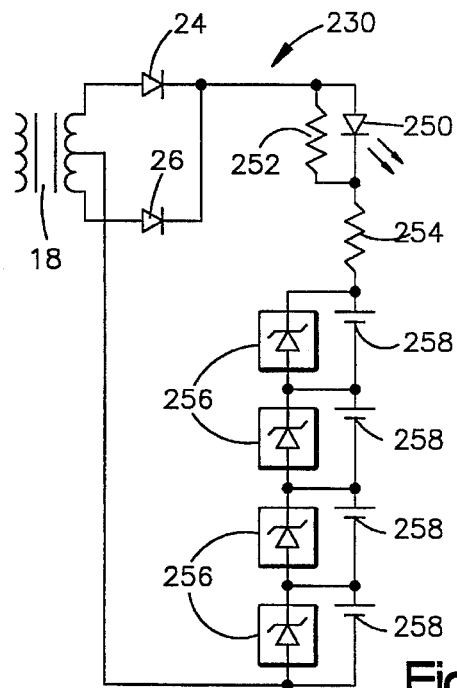
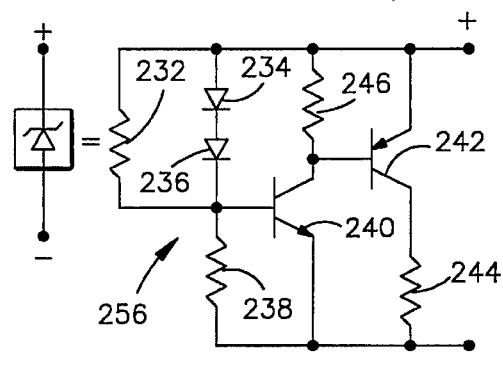
Fig.5a
Fig.5b
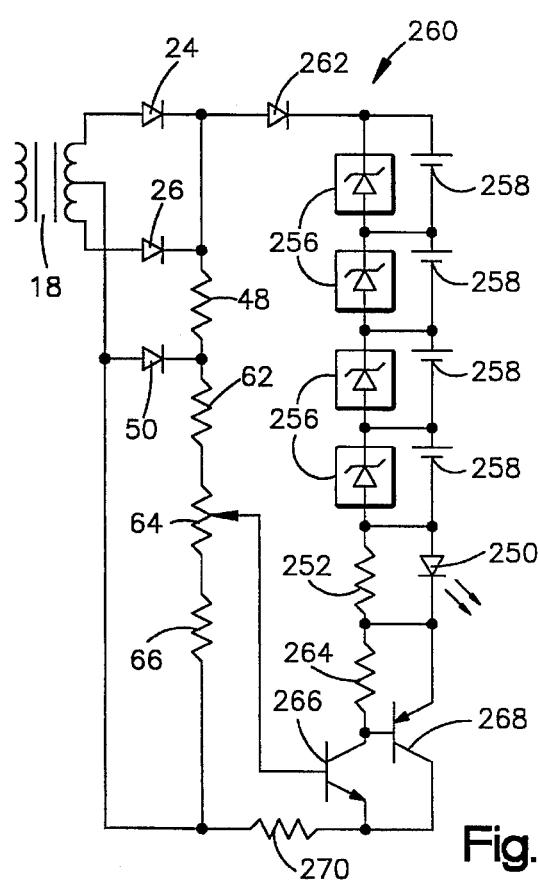
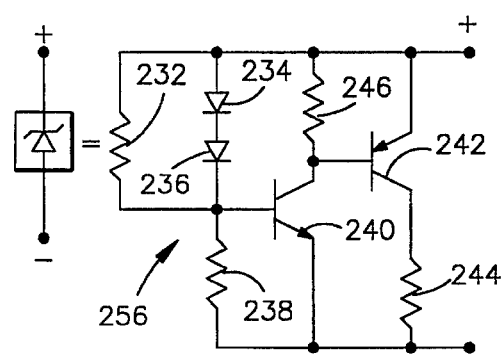
Fig.6a
Fig.6b

BATTERY CHARGER FOR CHARGING ALKALINE ZINC/MANGANESE DIOXIDE CELLS

CROSS-REFERENCE TO RELATED PATENT APPLICATION

This is a continuation-in-part of applicant's patent application U.S. Ser. No. 950,066, filed Sep. 23, 1992, now U.S. Pat. No. 5,291,116 which in turn was a continuation-in-part of U.S. Ser. No. 07/826,002, filed on Jan. 27, 1992, now U.S. Pat. No. 5,304,914.

FIELD OF THE INVENTION

A battery charger suitable for charging conventional alkaline-manganese primary batteries is disclosed.

BACKGROUND OF THE INVENTION

The recharging of primary batteries is frequently discouraged by battery manufacturers. Thus, for example, on page 2 of a publication entitled "Eveready Battery Engineering Data" (Union Carbide Corporation, New York, 1968), a warning is made that "IF 'EVEREADY' PRIMARY BATTERIES ARE SUBJECTED TO ANY FORM OF RECHARGING, ALL WARRANTIES . . . ARE NULL AND VOID. NOTE THE DISCUSSION ON PAGE 23."

Page 23 of the Union Carbide publication discloses that, under certain limited conditions, one may recharge a primary battery. Quoting the National Bureau of Standards (letter circular LC965), the publication states that: "Although the dry cell is nominally considered a primary battery it may be recharged for a limited number of cycles under certain conditions. 1. The operating voltage on discharge should not be below 1.0 volt per cell when battery is removed from service for charging. 2. The battery should be placed on charge very soon after removal from service. 3. The ampere-hours of recharge should be 120%–180% of the discharge. 4. Charging rate should be low enough to distribute recharge over 12–16 hours. 5. Cells must be put into service soon after charging as the recharged cells have poor shelf life."

As is disclosed by this Union Carbide publication, the prior art method for recharging primary batteries is unattractive. In the first place, an operating voltage on discharge above 1.0 volt severely limits the available energy which can be withdrawn from the battery, representing only shallow discharge. In the second place, it is not always possible to place a battery on charge very soon after removal from service. In the third place, end users of batteries often are unwilling to recharge a battery for a prolonged period of up to 16 hours, preferring shorter recharging cycles. In the fourth place, the recharged batteries produced by the prior process have poor shelf life.

It is an object of this invention to provide a battery charger for recharging primary batteries which can permit an operating voltage on discharge substantially below 1.0 volt.

It is another object of this invention to provide a battery charger for recharging primary batteries which minimizes the adverse effect of delayed recharging.

It is yet another object of this invention to provide a battery charger which can effectively recharge a primary battery in as little as about 8 hours.

It is yet another object of this invention to provide a battery recharger which will provide recharged primary batteries with substantially improved shelf lives.

It is yet another object of this invention to provide a battery recharger suitable for recharging rechargeable alkaline-manganese ("RAM") batteries.

It is yet another object of this invention to provide a battery recharger suitable for recharging rechargeable nickel-cadmium batteries, and also ordinary carbon-zinc batteries.

It is yet another object of this invention to provide a battery charger suitable for recharging batteries containing lithium and thionyl chloride.

It is yet another object of this invention to provide a battery charger suitable for recharging lithium-sulfur batteries.

It is yet another object of this invention to provide a battery charger equipped with visual means for displaying after whether a battery has been rejuvenated sufficiently to power a standard load for a fixed period and maintain a voltage above a test threshold.

SUMMARY OF THE INVENTION

In accordance with this invention, there is provided a battery charger comprised of a means for individually charging each of a multiplicity of cells with a direct current which has a specified range of current and voltage values, means for separately controlling the direct current applied to each of said cells, and means for providing a different amount of charge to each of said cells.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIG. 1, are a schematic of one preferred embodiment of the battery charger of this invention which utilizes a dual pulse reverse current pattern

FIG. 5 is a schematic of a battery charger suitable for charging a series connected group of cells with individual shunt regulation.

FIG. 6 is a schematic of a modified version of the battery charger of FIG. 5.

DESCRIPTION OF THE PREFERRED EMBODIMENTS

Figure 1A:
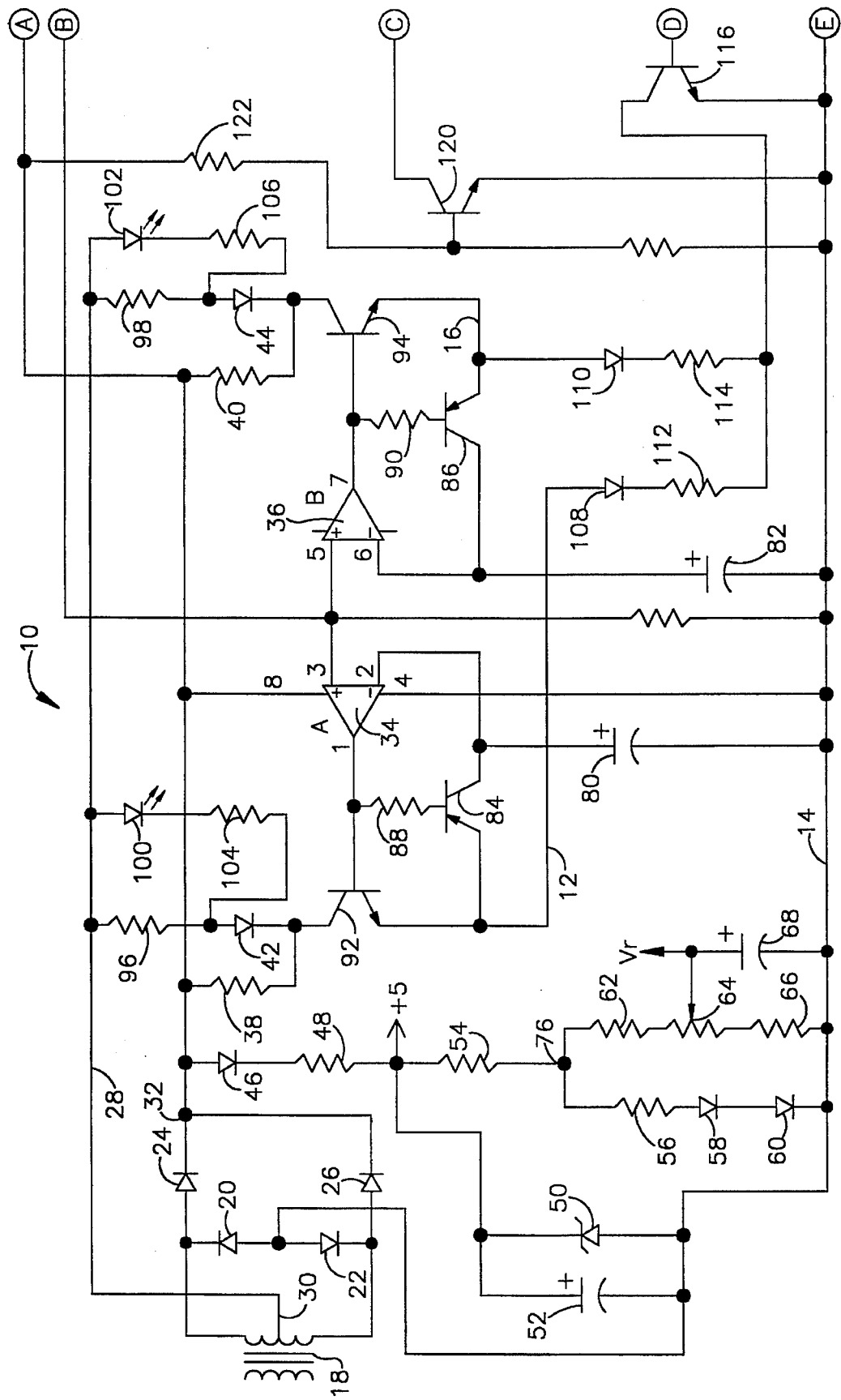
FIGS. 1A and 1B, which collectively comprise

In one illustrative preferred embodiment, the battery charger of this invention is used to charge primary zinc— manganese dioxide batteries. As is known to those skilled in the art, these primary zinc-manganese dioxide cells are usually considered to be non-rechargeable, being optimized to have their energy used and then to be discarded inasmuch as they are not protected from reaching chemically irreversible states.

These zinc-manganese dioxide primary cells are well known to those skilled in the art as "dry cells," "heavy duty dry cells," and "alkaline primary batteries;" and they are readily commercially available. Thus, by way of illustration and not limitation, and referring to Newark Electronics catalog number 110 (Newark Electronics, Chicago, Ill., 1989), one may purchase an Eveready EN91 alkaline battery (see page 562), an Eveready 101-5 zinc carbon battery (see page 562), an Eveready EV15 industrial general purpose zinc carbon battery (see page 562), an Eveready EV115 industrial heavy duty zinc carbon battery (page 562), a Duracell MN1500 alkaline battery (page 564), and the like.

By way of illustration, the dry cell may be a zinc—ammonium chloride—manganese dioxide carbon system; see, e.g., pages 34–54 of Charles Mantell's "Batteries & Energy Systems" (McGraw-Hill Inc., New York, 1983). Thus, e.g., the dry cell may be zinc-alkali—manganese dioxide primary battery (see pages 55–67 of the Mantell book), or a heavy-duty "dry cell" (see page 70 of the Mantell book), and the like.

In one preferred embodiment, the battery used in applicant's process preferably is an alkaline—manganese dioxide primary cell. By way of illustration, one such battery is disclosed in U.S. Pat. No. 4,857,424, the disclosure of which is hereby incorporated by reference into this specification. In the remainder of this specification, reference will be made to the use of the process with such battery, it being understand that the process also is applicable to other zinc carbon cells.

The charger of applicant's invention can recharge a battery which has been discharged to either a minor extent, or a major extent; and, furthermore, it is also capable of recharging a battery which was not placed on charge promptly following removal from service (which is often referred to as "sleepy battery" or a "battery with memory effects" when reference is made to nickel-cadmium batteries). Thus, applicant's charger is substantially more versatile than the charger described by the National Bureau of Standards letter circular, supra; and the charged cell produced by applicant's charger has a substantially improved shelf life when compared to the shelf life of the battery produced by the prior art charger.

The reverse pulse charger of the invention

In one embodiment of applicant's invention, described below, the battery charger provides both a long and a short reverse pulse to the cells being charged.

The discharged battery is then connected to applicant's battery charger, which is described elsewhere in this specification. Thereafter, in the first step of the process, a multiplicity of charging pulses are provided to the battery.

A source of current pulses is connected to a switching means which, in turn, is connected to the battery. The switching means selectively furnishes a particular current pulse to the cell to be charged, depending upon the electrical condition of the cell at that time.

The current pulses used in this embodiment of applicant's charger preferably are direct-current pulses with a duration of at least about 1 millisecond and, preferably, from about 1 to about 8 milliseconds, as preferably conveniently derived from conventional alternating current power sources. It is preferred that the direct current pulses have a duration of from about 5 to about 7 milliseconds and, most preferably, of about 6 milliseconds. However, as will be apparent to those skilled in the art, one may also use filtered power sources which provide substantially longer pulse options.

The current pulses will have an average value which does not exceed about 40 percent of the initial capacity of the cell and, more preferably is from about 9 to about 20 percent of the initial capacity of the cell. The initial capacity of the cell is the current rating given to such cell by the manufacturer. Thus, e.g., AA alkaline cells are rated at 1.5 ampere-hours at the 8 hour rate; and the pulses used to recharge such a cell would typically be no greater than about 200 milliamperes average.

In this embodiment of the charger of applicant's invention, means are provided for determining whether any particular direct current pulse should be delivered through the switching means to the cell. The determining means measures the stored value of the voltage of the cell and thereafter compares it at a specified point in time in the discharge cycle (discussed below) with a reference voltage. If the stored value of voltage of the cell is below the reference voltage, the current pulse is delivered to the cell. If the stored value of voltage of the cell is above the reference voltage, the current pulse is not delivered to the cell.

The reference voltage of the cell is the final voltage desired in the charged cell; it is specified at 25 degrees Centigrade with an approximate negative temperature coefficient of from about −0.07 to −0.13 percent per degree Centigrade. Thus, for a manganese dioxide primary alkaline cell, the reference voltage is at least about 1.585 volts and, preferably, is from about 1.60 to about 1.65 volts; in one embodiment, such reference voltage is 1.62 volts at 25 degrees Centigrade.

In this embodiment of applicant's charger, in no case does the reference voltage ever exceed 1.7 volts for an alkaline manganese cell). When the process is used with a lead acid battery, the reference voltage limit is 2.45 volts per cell. When the process is used with a RAM cell, the reference voltage limit is 1.7 volts per cell. When the process is used with a nickel-cadmium cell, the reference voltage limit is 1.42 volts per cell, which in this case represents the transition voltage between current limited and constant current charging. In general, the reference voltage must not exceed the long-term, safe float voltage of the cell.

Figure 1B:
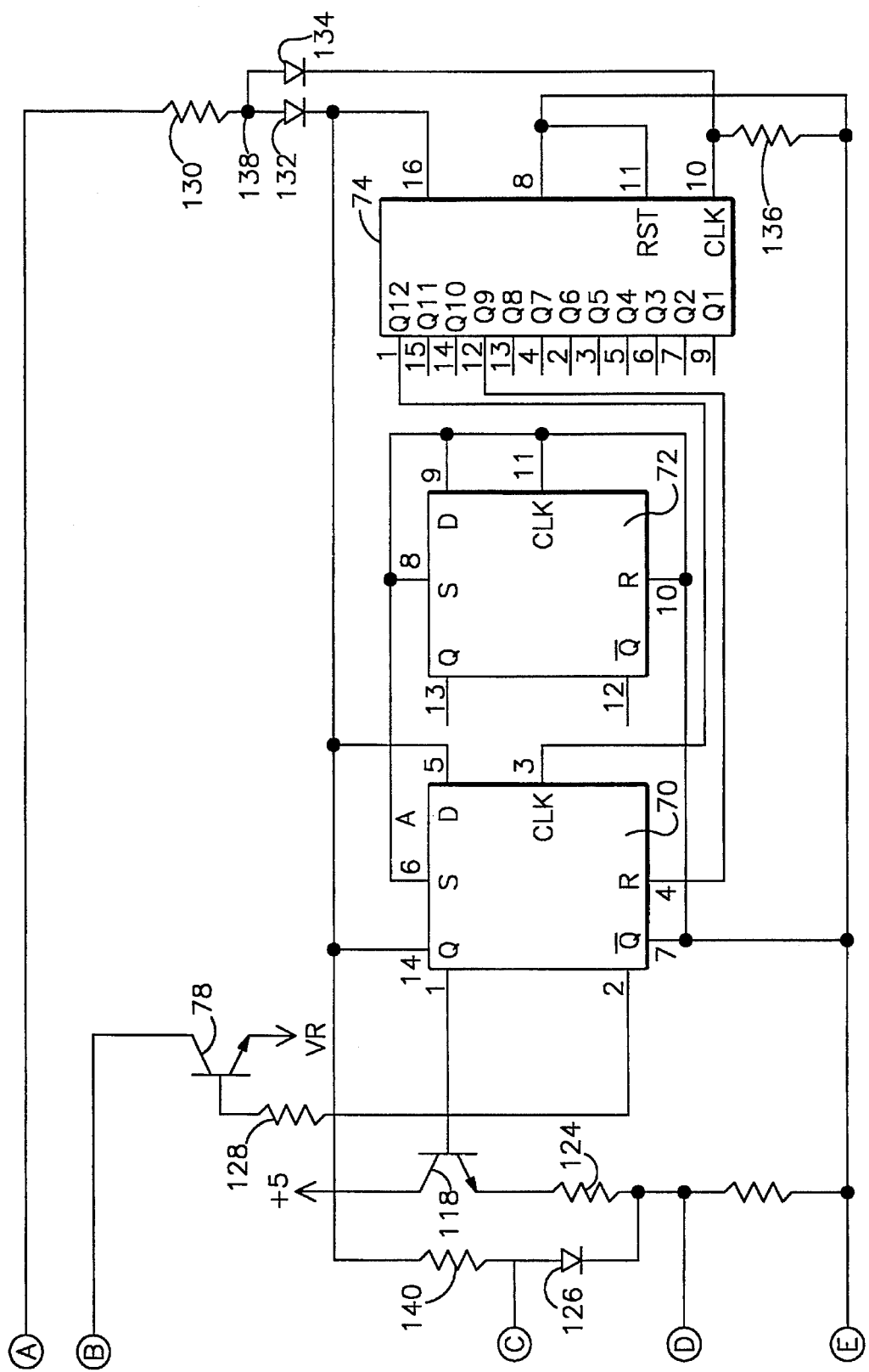

In one preferred embodiment, illustrated in FIG. 1, if the cell fails to accept and conduct a current pulse delivered to it by the switching means from the available source voltage, a small additional current path is provided to the cell supplying twice the source voltage. Without wishing to be bound to any particular theory, applicant believes that this additional current source insures initial chargeability of cells subject to prolonged discharge storage. As will be apparent to those skilled in the art, lead batteries subjected to prolonged storage after discharge often are resistant to the initiation of charging.

In this embodiment of applicant's charger, in addition to providing periodic direct current pulses selectively to the cell to be charged, the cell is periodically discharged. Pulses of direct current are periodically withdrawn from the cell. These pulses have a duration of from about 5 to about 35 percent of the duration of direct current charging pulses; and they also have a current value during discharge of from about 10 to about 25 percent of the average current value available from the charging pulses. Thus, by way of illustration, for a system clocked by a 60 hertz power source, which will provide an average current value of about 200 milliamperes for the charging pulse within the range of about 6 milliseconds, the discharge pulse typically will preferably have a duration of from about 1.0 to about 1.5 milliseconds and an instantaneous current value of about 40 milliamperes with a 120 hertz repetition rate.

In general, the discharge pulse represents a loss of from about 3 to about 8 percent of the available charger energy.

In addition to providing short charge pulses and withdrawing shorter discharge pulses from the cell, the charger of this embodiment of applicant's invention periodically also terminates the charging process and provide continuous discharge of current from the cell for a relatively long period of time.

The duration of the "continuous" discharge pulse will be at least about 0.5 seconds and, more preferably, at least about 1.0 seconds.

The current value withdrawn during the long pulse discharge is generally from about 10 to about 25 percent of the average current value available from the charging pulses. In one embodiment, illustrated in FIG. 1, the current value of the long discharge pulse is substantially identical to the current value of the short discharge pulse. In this embodiment, shared discharge components may be utilized.

It is preferred that from about 2 to about 15 percent of the total charging time be represented by periodic long discharge pulses. Thus, by way of illustration, when the long pulse discharge has a duration of about 2 seconds, the time between long pulses is about 30 seconds.

In general, when the charger of FIG. 1 is used with alkaline batteries, and with nickel-cadmium cells, and with RAM cells, the time between long pulses is preferably from about 10 to about 60 seconds; with the nickel-cadmium cells and the RAM cells, comparable pulse patterns to those used with the alkaline cells may be used. By comparison, with lead-acid batteries, the duration of the long pulses is from about 15 to about 30 seconds, and the time between long pulses is from about 1.5 to about 5.0 minutes.

Without wishing to be bound to any particular theory, it has been observed that the employment of the short pulse pattern and the resulting improvement in charge acceptance beyond initial acceptance levels (typically 40 percent in alkaline cells), combined with the long pulse pattern (which permits incremental recovery of cell capacity of cells subject to deep discharge or discharged storage on successive recharges) allows appropriate cell manipulation without requiring excursions beyond the safe float voltage limits of the cells and without the massive hardware required for that mode of operation.

In the embodiment of applicant's charger illustrated in FIG. 1, means are provided for measuring the value of, and storing the value of, the voltage of the cell at the point in time whenever discharge is terminated. At this point in time, the information regarding the cell voltage is used by a comparator to determine whether it exceeds the reference voltage. As indicated above, when cell voltage at the termination of discharge exceeds the reference voltage, no current pulse is delivered to the cell (but discharge pulses are still withdrawn from the cell on schedule regardless of the value of the cell storage voltage). Conversely, when the stored cell voltage is less than the reference voltage, the current pulse is allowed to flow to the cell.

FIG. 1 is a schematic diagram of one preferred embodiment of the battery charger 10 of applicant's invention. The embodiment of FIG. 1 is suitable for charging two alkaline cells independently. It will be apparent to those skilled in the art that, when battery charger 10 is to be used with other types of cells (such as lead acid cells), different time constants and current values must be provided by the circuit.

Referring to FIG. 1, one alkaline battery may be connected between point 12 and common bus 14, and another alkaline battery may be connected between point 16 and common bus 14. It will be apparent to those skilled in the art that one may design a similar circuit adapted to charge 4, 8, 20, or any arbitrary and desired number of cells.

Referring again to FIG. 1, alternating current preferably is provided through mains transformer 18 to diodes 20, 22, 24, and 26. In one embodiment, the alternating current is standard 120 volt/60 hertz mains power. In another embodiment, the alternating current is conventional 220 volt/50 hertz mains power. Other alternating current sources also may be used.

The alternating current provided to diodes 20 and 22 is rectified. The direct current thus produced is connected to common bus 14. The main positive bus 28 is taken from the center tap 30 of the secondary of transformer 18.

Diodes 24 and 26 provide a rectified positive voltage to bus 32, which is about twice as great as that voltage on bus 28. The positive voltage on bus 32 may be used to power comparators 34 and 36 and to provide the source for the resistance cell breakdown voltage provided through resistors 38 and 40.

As indicated in the specification, if a cell connected between bus 14 and either point 12 or 16 fails to conduct, then resistors 38 and/or 40 will provide voltage from bus 32 to the nonconductive cell by reversing isolating diodes 42 or 44. This increased voltage generally is sufficient to initiate charge acceptance within the cell.

Means for comparing the voltage of either cell with a reference voltage derived from the network comprised of diode 46 and resistor 48 is also provided by the circuit. In the embodiment illustrated in FIG. 1, such a means is provided by a current from bus 32 which passes through isolation diode 46 (which functions as a reverse discharge isolator), and current limiting resistor 48 to zener diode 50; this current is filtered by capacitor 52. Zener diode 50 typically has an approximately 5 volt breakdown voltage to provide appropriate supply voltage for the digital integrated circuits 70, 72, and 74 and a well-regulated, zero-temperature coefficient source for the second stage regulator, consisting of elements 54 through 68. Current from the voltage provided by elements 50 and 52 flows from resistors 54 and 56 in series, and through diodes 58 and 60 in series with them. Diodes 58 and 60 provide a secondary regulator to help insure minimal line voltage perturbation, and they provide a large negative temperature coefficient. Thus, by choosing the relationship between resistors 54 and 56, a desired temperature coefficient may be selected.

The junction 76 of resistors 54 and 56 is the source of current for resistors 62, 64, and 66 in series, with variable resistor 64 acting as the voltage reference adjustment. Capacitor 68 acts as a secondary filter for the reference voltage.

The reference voltage is delivered to comparators 34 and 36 through transistor switch 78 under the control of the timing circuits to be described later.

The cell voltage at points 12 and 16 is tracked by transistor switches 84 and 86, respectively, and stored on capacitors 80 and 82, which are connected to the inverting inputs of comparators 34 and 36. In the embodiment illustrated, transistors 84 and 86 are controlled by the outputs of comparators 34 and 36 through resistors 88 and 90 and, thus, are automatically turned on when main battery pulse charging transistor switches 92 and 94 are deactivated.

Primary charging current pulses to the batteries are provided through current limiting resistors 96 and 98, which are shunted by light-emitting diodes 100 and 102, which are in turn current-limited by protective resistors 104 and 106; and they act as charging activity displays.

Discharge pulses from cells connected at points 12 and 16 flow through isolation diodes 108 and 110, and discharge current control resistors 112 and 114, when transistor switch 116 is on. Transistor switch 116 is on when either transistor 118 turns it on through resistor 124, or transistor 120 permits current to flow through resistor 140 and diode 126. Transistor 120 will prevent current through resistor 140 from reaching transistor 116 by shunting it to common bus 14 whenever bus 32 is sufficiently positive to power transistor 120 through resistor 122. In other words, transistor 120 acts as a zero crossing enable switch for transistor 116 to provide the brief discharge pulses through resistors 112 and 114.

The two-second discharge pulse is provided by powering transistor 116 through resistor 124 from transistor 118 when flip-flop 70 is turned on (binary 1). At that time, flip-flop 70 also disconnects voltage reference switch 78 from the non-inverting inputs to comparators 34 and 36.

The additional flip-flop 72 is unused, and its inputs are appropriately connected to common negative bus 14 to prevent noise response in this unused half of the integrated circuit containing flip-flop 70.

Flip-flop 70 is, in turn, controlled by twelve-bit binary counter 74, which turns it on when output Q12 of counter 74 transits positive and turns it off when output Q9 of counter 74 becomes positive. Thus, flip-flop 70 is on only from the positive edge onset of Q12 to the next positive output of Q9 (which is about fifteen percent of the time).

Counter Q12, in turn, counts 120 pulses per second (in the case of a 60 hertz source) derived from bus 32 through resistor 130, diode 134, and resistor 136 connected to its clock input. Junction 138 between resistor 130 and diode 134 is clamped to the plus-five volt power supply line through clamp diode 132 in order to prevent excessive voltage from being applied to the clock input of counter 74.

By way of illustration and not limitation, certain conventional and widely available components are suggested below for use in device 10. However, it will be readily apparent to those skilled in the art that other, comparable, commercially available components may be substituted for those described with no substantial adverse effect.

It is preferred that all of the resistors in device 10 be commercially available carbon-film resistors, with the exception of resistors 96 and 98 (which are 2.0 watt resistors, such a wire-wound, metal-film, or carbon-film 2.0 watt resistors).

It is preferred that each of the diodes in device 10 be a 1N4001 diode, or be comparable thereto. The zener diode 50 should preferably be 1N4733A zener diode, or be comparable thereto. Light-emitting diodes 100 and 102 are preferably selected on the basis of their appearance.

PNP transistors 84 and 86 are preferably 2N4403 transistors, or any transistor even remotely similar thereto. NPN transistors 92, 94, 116, 118, 120, and 78 are preferably 2N4401 transistors, or any comparable transistor.

Comparators 34 and 36 may be halves of a LM358 integrated circuit, or may be virtually any dual operational amplifier such as, e.g., 1458. Alternatively, comparators 34 and 36, when used in larger system with additional comparators, could be part of a LN324 quad operational amplifier (or of a similar device).

Flip-flops 70 and 72 are marked to correspond with the pin layout of CMOS part 4013. Binary counter 74 is shown as a CMOS part 4040.

Filter capacitors 52 and 68 are typical small electrolytic capacitors. Information storage capacitors 80 and 82 are preferably solid electrolyte tantalum units.

For a system designed for no more than four AA-size cells to be simultaneously charged, transformer 18 should preferably be a half-by-half core medium quality (M19) step-down transformer with a secondary voltage of 10.8 volts center tap open circuit.

For a system requiring larger capacity (either more cells or larger cells), a larger transformer core will be required to provide the needed power. Voltage need not be increased unless groups of cells are to be charged in series.

The charger illustrated in FIG. 1 may be used to recharge Rechargeable Alakaline Manganese cells. As is known to those skilled in the art, Rechargeable Alkaline Manganese cells are currently available (as "RAM" cells) from the Battery Technology Inc. corporation of Missasauga, Ontario, Canada. These RAM cells are specifically intended for recharging, and the significantly improved cycle life has been provided by modifying certain characteristics of primary alkaline cells.

Low temperature operation, peak charge and discharge current, and total capacity of these cells are somewhat reduced from their primary cell counterparts.

In the process of this invention, if used with RAM cells, no significant change in charger 10 is required. However, the reference voltage used for these cells is recommended to be 1.65 volts while primary cells, for which this system is intended, provide iproved charge storage seal life at 1.625 volts.

The battery charger illustrated in FIG. 1 also may be used to recharge lead acid batteries. These lead acid batteries are well known to those skilled in the art and are described, e.g., on pages 142–187 of the Mantell book. These batteries are available as single cells, but they generally are provided as multi-cell preassembled batteries. While accessible liquid electrolyte batteries are still widely available, sealed lead acid (SLA) batteries have become an ever-increasing portion of the market, both as flooded cells (typical of automotive applications) and starved (recombinant) or gel cells, typical of industrial applications. Thus, in applicant's process, a typical battery charger appropriate for these applications would be designed for a multi-cell series configuration, with 6 and 12 volt nominal (i.e., 3- and 6-cell groups) being the most common. An appropriate set of constants by the same architecture shown in FIG. 1 would be a reference voltage 2.3 volts per cell, an average available charging current of from about 1 to about 50 percent of the nominal ampere-hour capacity, a charge withdrawal ratio comparable to that used with the alkaline cells, and time constants very much longer (as discussed elsewhere in this specification).

The battery charger illustrated in FIG. 1 also may be used to recharge nickel-cadmium or nickel hydride batteries. These batteries differ fundamentally in their charge requirements from all of the batteries previously discussed. They are designed for constant current recombinant standby service. While many schemes are available to enhance rechargeability, generally referred to as delta-T or delta-V systems, these approaches are generally a bit tricky and require battery and charger to be an integrated design. In applicant's system, for improved nickel—cadmium performance and no zinc/manganese dioxide capability, a modification of the device 10 which provides constant current in place of the no-charge portion of the cycle (when the comparator indicates that the voltage exceeds the reference voltage) will work very effectively if the reference voltage is set to about 1.42 volts per cell and 25 degrees Centigrade with a negative temperature coefficient of 0.1 percent per degree Centigrade. Charging current can be as high as twice the nominal ampere capacity of the cell for completely conventional cells, without requiring high-temperature of fast-charging special construction cells. When the sampled voltage exceeds the reference voltage, a current of about 10 percent of the ampere hour capacity for nickel—cadium batteries is generally appropriate. When nickel—metal hydride batteries are being charged under these conditions, a current of about 2.5 percent of the ampere hour capacity is recommended. The recombinant limit of fully charged nickel—metal hydride cells is described by their manufacturers as being substantially lower in value than the recombinant current capacity of a nickel—cadmium cell of similar physical size.

Another dual pulse reverse current charger

Figure 2:
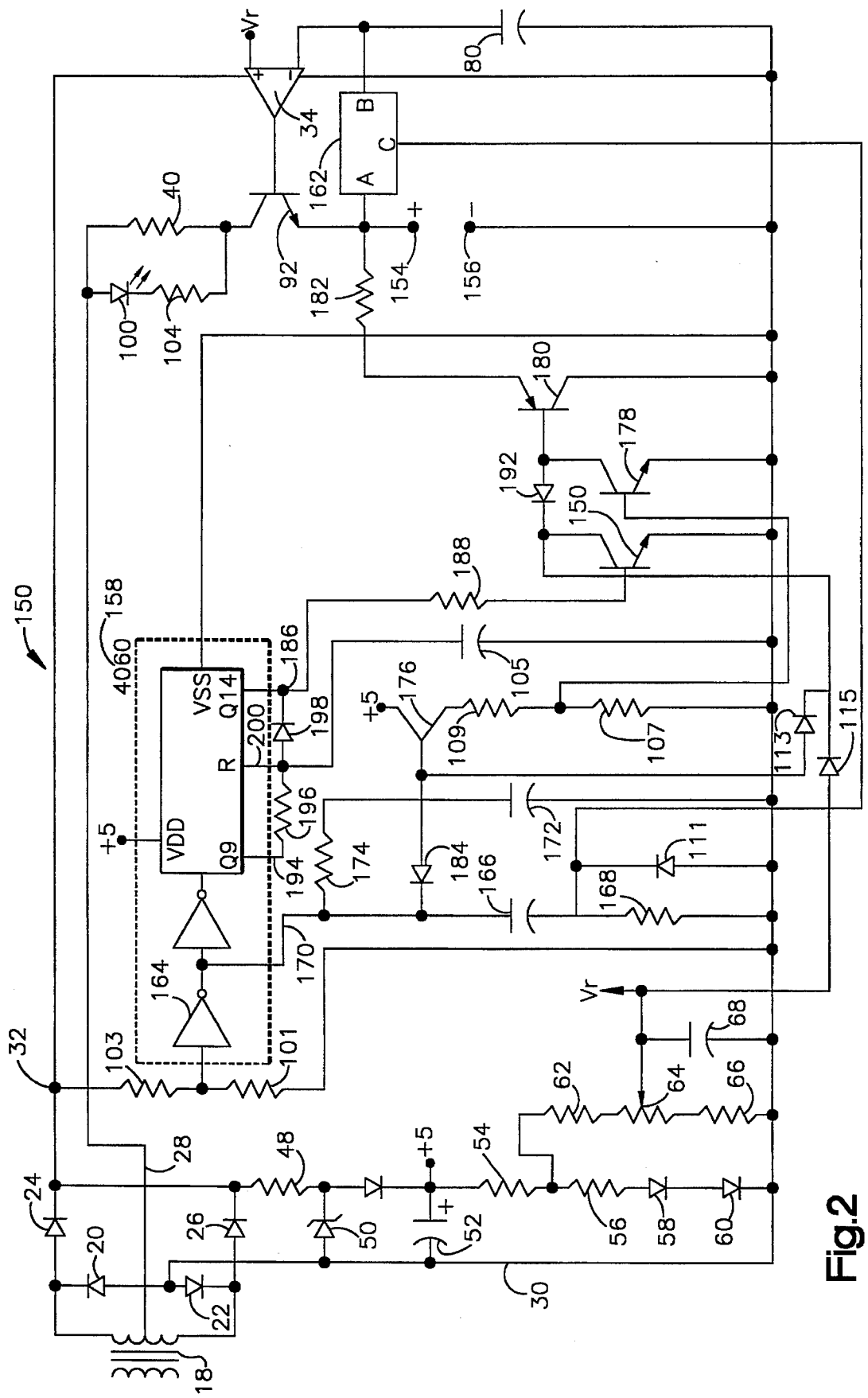
FIG. 2 is a schematic of another preferred battery charger of this invention utilizing a dual pulse reverse current pattern.

Another embodiment of a dual pulse reverse current charger is illustrated in FIG. 2. Referring to FIG. 2, it will be seen that battery charger 150 is comprised of mains transformer 18, which provides power at an appropriate voltage for a single cell (not shown) which may be attached between positive terminal 154 and negative terminal 156. In general, it is preferred that the transformer voltage be from about 11 to about 12 volts center tapped RMS (root mean squared).

The circuit of FIG. 2 is very similar in many respects to that illustrated in FIG. 1, and it shares many common circuit elements. However, it differs in the respects described below.

Referring again to FIG. 2, the timing circuit 158 is implemented by a 4060 integrated circuit which provides the sample strobe pulse to CMOS switch 162 which, typically, may be a section of a 4066 integrated circuit by differentiating the output of the input inverter 164 of the 4060 integrated circuit with a time constant whose RC value is equal to the product of capacitor 166 and resistor 168. This occurs at the leading edge of the inverted (positive) pulse at 170 synchronous with the main zero crossing.

The "short high current" discharge pulse is generated by the same pulse with a delay equal to the product of capacitor 172 and resistor 174, amplified by transistors 176 and 178. These transistors typically are 2N4401NPN transistors which, in turn, power PNP transistor 180 (which may be type 2N4403) and thereby connects resistor 182 through transistor 180 to terminal 156.

The current through resistor 182 will be equal to the voltage on the battery under charge (not shown) minus the base emitter voltage drop of transistor 180, divided by the value of resistor 182. The duration of this discharge event will be equal to the duration of the positive pulse at point 170 minus the delay caused by the time constant 172–174, since the end of the pulse will be provided promptly through diode 184. A similar course of events will occur approximately once a minute when the output 186 of stage Q14 is applied through resistor 188 to NPN transistor 150 (which may be a 2N4401). However, the additional diode drop of diode 192 will reduce the voltage across resistor 182 by about 600 millivolts when compared to the effect of driving via transistor 178. Thus, the discharge current drained by this path will be roughly one-half of that removed by the fast pulse previously described. The duration of the pulse will be set by the choice of the output 194 used to reset IC 158 via resistor 196. Diode 198 clamps the reset 200 until Q14 output 186 becomes positive; then reset occurs when output 194 subsequently becomes positive. Therefore, the duration of the long pulse can be selected by choosing the appropriate reset output source (Q9 in FIG. 2), which yields approximately 2 seconds.

In the battery charger 150 of this FIG. 2, the charging current is controlled by resistor 40. Although no high voltage injector is illustrated in this embodiment, it will be apparent to those skilled in the art that such injector may be used.

Referring again to FIG. 2, it will be seen that battery charger 150 also is comprised of a voltage divider comprised of resistors 101 and 103, which provides the synchronous input to the counter 158 for zero-crossing a.c. line synchronization. Resistor 196 and capacitor 105 form a noise filter between Q9 and the reset of integrated circuit 158. Resistors 107 and 109 connect transistor 176 to transistor 178. Diode 111 provides a prompt recharge path for capacitor 166, and diodes 113 and 115 clamp $V_r$ and the input to transistor 176 during the long pulse discharge.

Another embodiment of the battery charger

Figure 3:
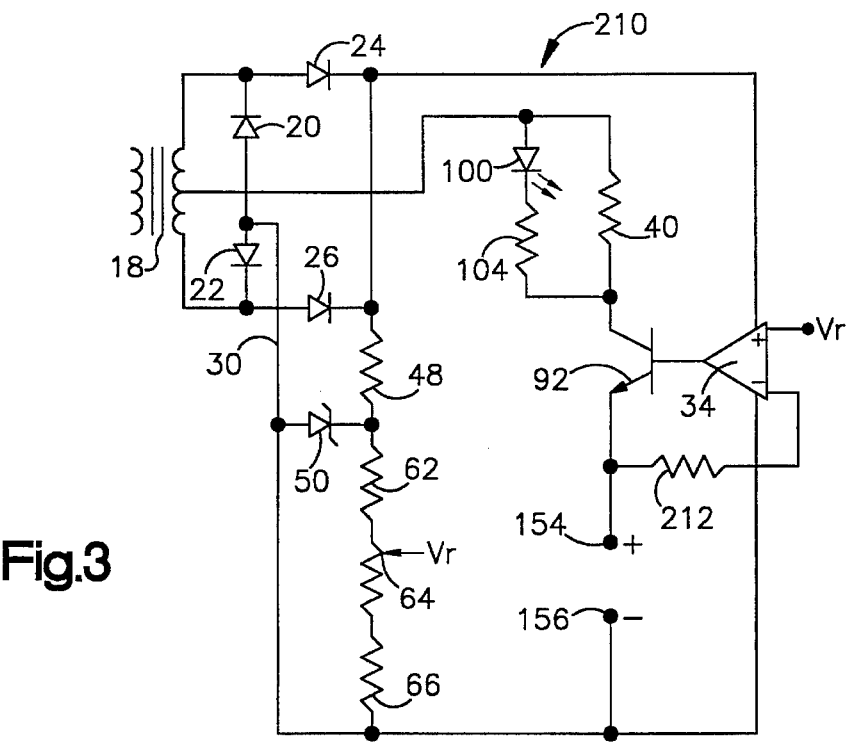
FIG. 3 is a schematic of another preferred battery charger of this invention.

FIG. 3 illustrates another preferred battery charger 210 which is within the scope of applicant's invention. As will be seen from FIG. 3, mains transformer 18 provides power at an appropriate voltage (preferably in the range of from about 11 to about 12 volt center tapped r.m.s.) for charging a single cell (not shown) attached between terminals 154 and 156. Current is provided by diodes 20 and 22 and the centertap 30 of the secondary of transformer 18 through current control resistor 40 (approximately 6 ohms in this illustration, and controlled by series switch 92 [2N4401 or similar transistor]). A light emitting diode 100 in series with resistor 104 acts as a "pilot light" to display "activity" in resistor 40.

Transistor 92 is controlled by the output of comparator 34, which could be the output of a low cost operational amplifier (such as the 741 [single] or the LM358 [dual] or the LM324 [quad]). The comparator 34 responds to the difference between the cell voltage applied to its inverting input (−) and a reference voltage applied to the noninverting input (+). As long as the battery voltage is less than the reference voltage, the comparator 34 output is high, switching on transistor 92 and allowing charging current to flow through resistor 40. Once the battery voltage is equal to the reference voltage, the comparator 34 will restrict the base current into transistor 92 and the charging current into the cell being charged.

The reference voltage is derived from a voltage divider 62, 64, 66 connected to a stable voltage source 50. Zener diode 50 is powered by diodes 24 and 26 through current control resistor 48. The higher voltage available from diodes 24 and 26 (compared to the centertap) broadens the "conduction" angle of diode 50 in this unfiltered, economical, and reliable system. Diodes 24 and 26 also provide power to the comparator 34 to insure sufficient "output swing" for the low cost operational amplifier (comparator 34) to saturate transistor 92.

There are several limitations to this system. Diode 50 can be chosen (a low voltage Zener diode) to have almost the required negative temperature coefficient. Unfortunately, as is known to those skilled in the art, low voltage Zener diodes have relatively poor dynamic resistance values, and line voltage variations would produce unacceptable reference voltage variations. Thus, diode 50 should preferably be a low impedance device (in the range of 5 volts, with substantial operating currents, perhaps 50 milliamperes, to guard against "soft knees" often found in low cost devices). Unfortunately, in this voltage range, temperature coefficients are generally near zero. This problem is addressed by the circuit of FIG. 4.

A modified battery charger

Figure 4:
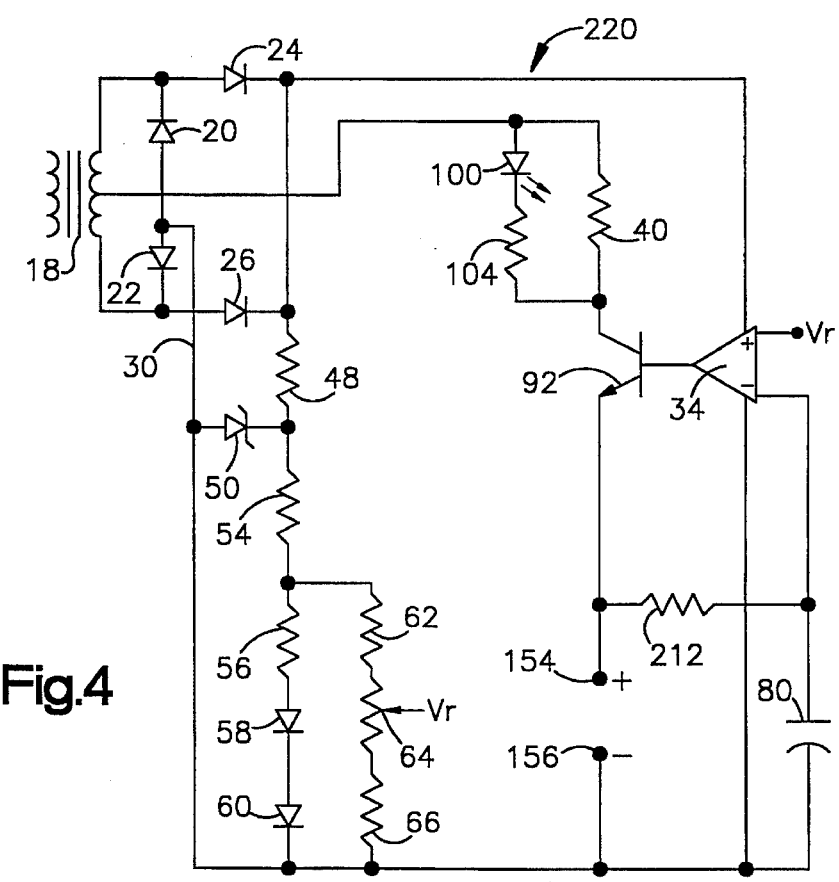
FIG. 4 is a schematic of modified version of the battery charger of FIG. 3.

FIG. 4 is an improved version of the battery charger of FIG. 3. Referring to FIG. 4, it will be seen that battery charger 220 provides a reference voltage source with certain advantages. Diode 50 is a diode which may be, e.g., the 1N4733A type and which provides a stable (but approximately zero temperature coefficient) voltage source to resistors 54 and 56 and diodes 58 and 60 in series, wherein diodes 58 and 60 are conventional, forward-biased silicon diodes (such as, e.g., 1N4001) which exhibit a large negative temperature coefficient and also provide further voltage stabization. Thus, the ratio of the resistance values of resistors 54/56 provides a selection mechanism for the temperature coefficient from near zero (as resistor 54 approaches zero ohms) to excessively negative (as the resistance of resistor 56 decreases in value (resistors 62, 64, and 66 are assumed to be large compared to the reistance of resistors 54 and 56 for the sake of simplicity). Resistor 62 is selected to center resistor 64 at the desired reference voltage, and resistors 62 and 66 set the adjustment "span" of resistor 64.

Resistor 212 acts as a current limiter and safety resistor (against failure of comparator 34) in this unfiltered system where 120 times per second (for 60 hertz mains power) power is provided to comparator 34 and the reference voltage network synchronously with the availability of charger power to resistor 40 and transistor 92. Thus, the system will charge when it can (if required) without the addition of filter capacitors (energy storage), with a resultant savings in cost and reliability.

A drawback of this design, if charging time is important, is the effect of comparing battery voltage directly to reference voltage in a system with a nonconstant charging current (which peaks 120 times per second at the crest of the mains sine wave). Each current peak produces a cell voltage peak equal to the "true" cell voltage plus the internal resistance times current (IR) value of the instantaneous charging current. Thus, as the cell approaches full charge, the "peak" voltage will exceed the reference voltage before the cell is fully charged, and comparator 34 will react to reduce drive to transistor 92 and, thus, current to the cell near the peak of the sine wave voltage. This will result in a reduced charging rate toward the end of charge and an extended charging time.

Referring again to FIG. 4, the section to the right of diode 100 and resistor 104 may be repeated any number of times to provide simultaneous, individually controlled charging of any desired number of cells, provided the power components are scaled appropriately.

FIG. 4 thus illustrates a simple modification of the configuration of FIG. 3 which partially overcomes the "artificial" rate limitation discussed above via the addition of capacitor 80. If the product of resistor 212 and capacitor 80 is long compared to the mains half cycle period (8.33 milliseconds in this example), the "average" battery voltage will be compared to the reference voltage.

The battery charger illustrated in FIG. 5 represents another approach to cell charging. A series string of cells 258 (i.e., a battery consisting of multiple cells in series) is provided with a common current from mains transformer 18, rectifier diodes 24 and 26, and resistor 254. Light emitting diode 250 (with excess current shunted by resistor 252) is simply a convenient "power" indicator.

Each cell 258 is shunted by a "pseudo-Zener" which is made from network 256, illustrated at the lower left of FIG. 5. Diodes 234 and 236, and the base emitter voltage of transistor 240 are the primary sources of the negative temperature coefficient and, combined with resistor 238, the "Zener voltage." Resistor 232 provides a simple means of reducing the excessive negative temperature coefficient; and resistor 244 is a simple means for removing the bulk of the circuit dissipation from the transistor 242 (which may be, e.g., a 2N4403, a common PNP complement to the 2N4401 which provides adequate NPN performance.

It will be apparent to those skilled in the art that, with applicant's invention, it is possible to charge alkaline cells in series and to control the individual cells with simple, economical shunt regulators, achieving good regulation and negative temperature coefficients without the need for any external power source for each regulator.

Another series charged shunt regulated charger

Another series charged shunt regulated charger 260 is illustrated in FIG. 6. Referring to FIG. 6, it will be seen that battery charger 260 is an improvement upon the system of FIG. 5. In the device of this FIG. 6, resistor 254 is replaced with a constant current generator comprised of transistors 266 and 268 and resistors 264 and 270, whereby the reference voltage derived from resistor 64 sets the current through resistor 270 and, thus, the cells 258. The advantage of this approach, aside from the lower voltage requirements (and, thus, lower cost, less heat, and higher utilization efficiency) for transformer 18, resistor 254 or its equivalent (266, 268, 270) is the ability of the device to adjust the current to "trim" the regulator voltage to a desired value. The relative behavior of diodes 234 and 236 is very reproducible, but the overall setpoint requires a production adjustment.

It will be apparent to those skilled in the art that the reference voltage is a single, approximately zero temperature coefficient, voltage source, diode 50. Thus, charging current is fixed independently of temperature, and the negative temperature coefficient is provided by the design of the "pseudo Zener" 256. It will also be apparent that diode 262 functions as an "isolator" between the "battery" and the rest of the system which, in this circuit, would drain current from the battery if mains power were to be removed.

Another modified shunt regulated charger

Figure 7A:
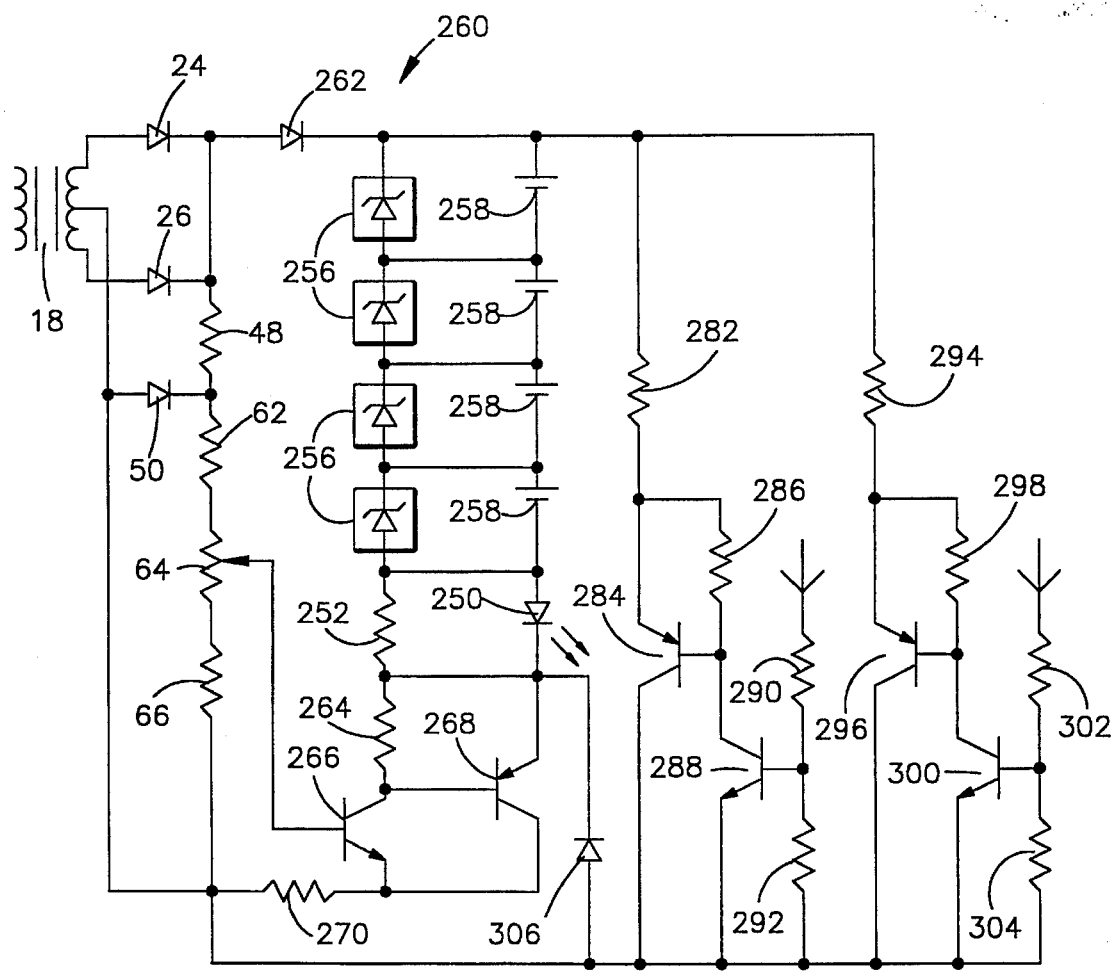
FIG. 7 is a schematic of a modified version of the battery charger of FIG. 6.
Figure 7B:
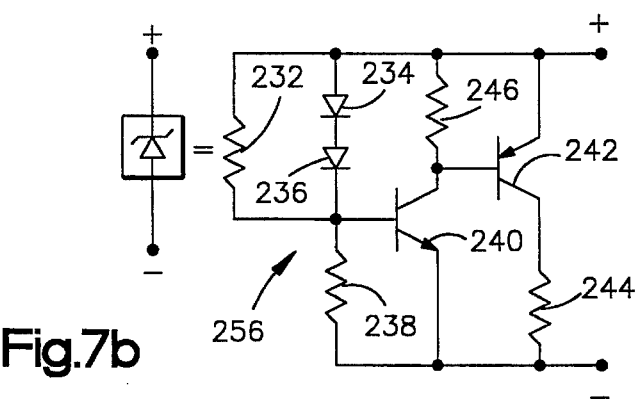

FIG. 7 illustrates a battery charger 280 in which, because of the addition of a reverse current diode 306, can impress reverse current pulse patterns upon the entire series string of cells 258. A pair of drive pulses, produced from a timing network substantially similar to the timing network of the device of FIG. 2 (not shown), controls reverse current, as determined by resistor 282 through input via resistor 290 and through resistor 294 through input via resistor 302. It will be apparent to those skilled in the art that the reference voltage must be appropriately suppressed (see FIG. 2) for pulses longer than about 1 millisecond, centered at the mains zero crossing.

An individual cell shunt regulated device

Figure 8:
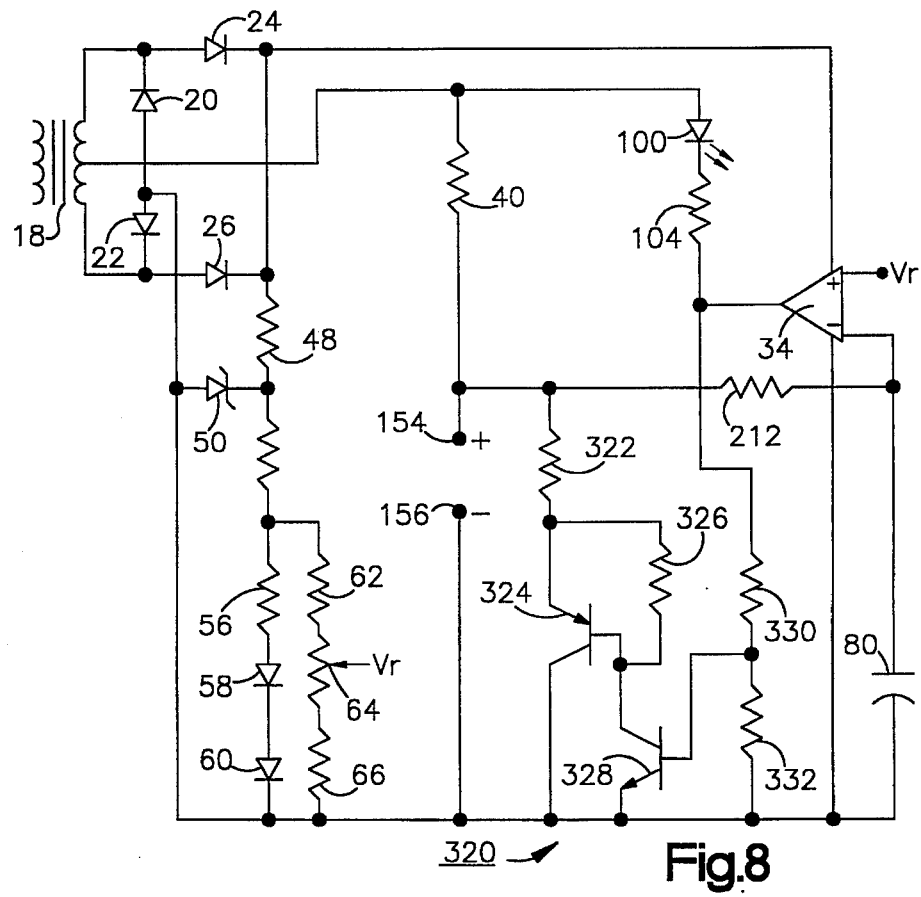
FIG. 8 is a schematic of a shunt-regulated battery charger.

The device illustrated in FIG. 8 is a special purpose variant of the device of FIG. 4 in which the time constant produced by resistor 212 and capacitor 80 is relatively short compared to the 8.33 milliseconds time constant of the mains half period; and this RC network is suitable for high frequency noise control. The feedback from this network is "real time" (see FIG. 4) and is not averaged. When the cell voltage of this embodiment reaches the reference voltage, even momentarily, the cell current from resistor 40 is diverted through resistor 322 and transistor 324, controlled by transistor 328 from the output of the comparator 34 through resistor 330. Thus, as will be apparent to those skilled in the art, the output can be "clamped" at the reference voltage with negligible overshoot, and the charging will be relatively slow. However, the very small charging current towards the end of the charge allows diffusion equilibrium to essentially remove concentration gradients without reverse current pulses. The charger of this device is relatively "gentle," with substantially no overshoot and a taper to virtually zero current as full charge is approached; thus, little gas is evolved. Thus, for cells intended for prolonged standby, without large dendrite formation, and in applications where slow charging is acceptable, this device represents a practical standby power source for use with, e.g., burglar and fire alarms, emergency lighting, etc. It will be apparent to those skilled in the art that the series switch configuration of FIG. 4 could also be adapted for this purpose.

An economical battery charger

Figure 9:
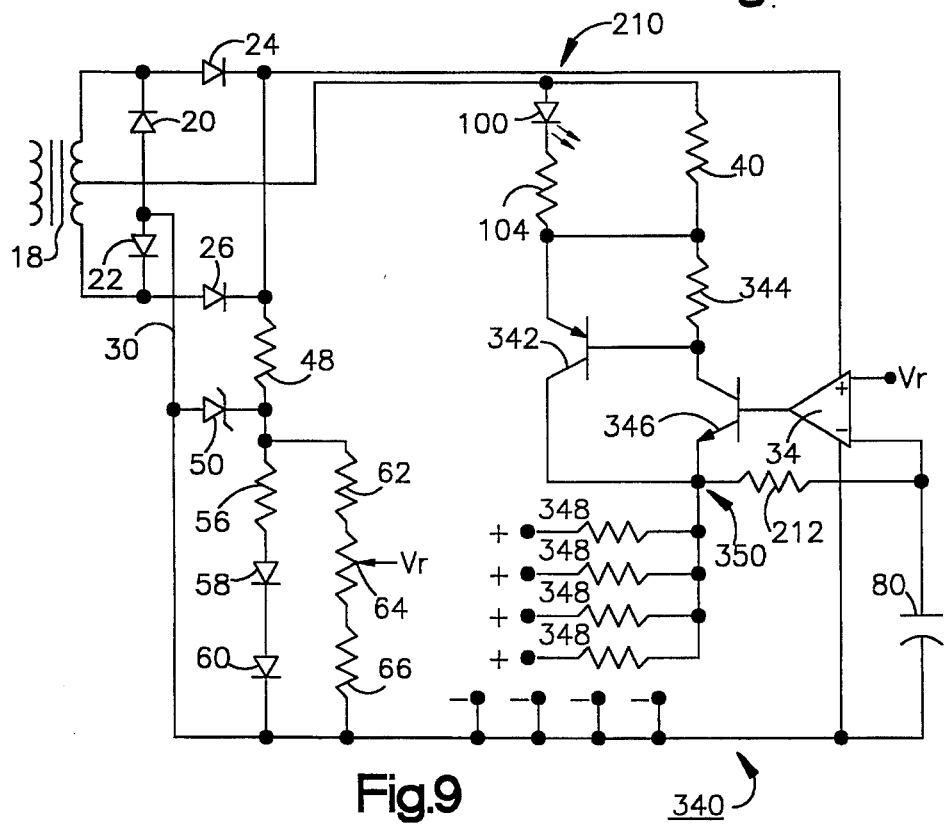
FIG. 9 is a schematic of another preferred battery charger within the scope of this invention.

FIG. 9 illustrates a relatively inexpensive battery charger 340 which may be produced in accordance with applicant's invention. The closed loop control system of this invention provides another means for controlling the individual cells to be charged.

Referring to FIG. 9, it will be seen that a single comparator 34 is used to control the voltage appearing at the common end 350 of the series battery resistors 348. It is the voltage at common end 350 which is controlled by comparison to the negative temperature coefficient reference voltage applied to the noninverting (+) input of comparator 34. This voltage is "averaged" by the RC time constant of resistor 212 and capacitor 80 and applied to the inverting input (−). As will be apparent to those skilled in the art, individual cell control may be approximated by a single, relatively high current controller consisting of comparator 34, transistors 342 and 346, resistor 344, and total current control resistor 40. If the output at point 350 is adjusted to the desired final output voltage (such as 1.625 volts), then the single controller is capable of controlling all of the current required to charge all of the cells, and the slowly tapering charge and risk of current hogging by a damaged cell may be acceptable. The larger the resistance of resistor 348, the better the "final charge quality," i.e., individual control, but the slower the charge. A value in the range from about 1 to about 2 ohms for AA cells provides an acceptable approximation of individual cell regulation at minimal cost.

The output of the charger of this invention

In FIGS. 1–9, applicant has illustrated nine different means for achieving the aims of his invention. Many other devices will be apparent to those skilled in the art which are able to achieve the same aims; they are also within the scope of the invention.

As will be apparent to those skilled in the art, each of the aforementioned devices shares certain characteristics such as, e.g., means for producing a direct current voltage at 25 degrees centigrade of from about 1.6 to about 1.7 volts, means for individually limiting the voltage applied to each cell being charged to a direct current voltage at 25 degrees centigrade of from about 1.6 to about 1.7 volts, means for individually limiting the current applied to each cell being charged to a current of less than about 800 milliamperes per cell, and means for individually and continuously varying the current applied to each cell.

Additionally, when the battery charger is used to charge alkaline batteries, means are provided for limiting the maximum current supplied to each cell, independent to the cell's state of charge, to a value consistent with the cell life requirements. In general, it is preferred to limit this current value to no more than about 400 milliamperes and, more preferably, no more than about 200 milliamperes.

As will be apparent to those skilled in the art, applicant's battery charger is able to accomplish the aforementioned goals with as few as only one power source per battery charger, regardless of how many cells are being charged by the charger, and regardless of whether the cells are connected in series to form a battery. It will be apparent, however, that one may use multiple power sources in the battery charger. Such a course of action is not seen to be advantageous.

Applicant's device is comprised of a means for producing a direct current voltage at 25 degrees centigrade of from about 1.6 to about 1.7 volts. Thus, in the device illustrated in FIG. 1, 2, 3, and 4, 8, and 9, the voltage derived from adjustable resistor 64 serves this function. In the device illustrated in FIGS. 5, 6, and 7, this function is served by the construction of shunt regulator element 256 which is preferably adjusted by adjusting the total series current using a voltage reference derived from resistor 64 (see FIGS. 6 and 7).

The direct current voltage produced by such means is the voltage at 25 degrees Centigrade. In several embodiments of applicant's invention (i.e., every embodiment except that of FIG. 3), applicant's device is also comprised of a means for producing a direct current voltage of from about 1.6 to about 1.7 volts at 25 degrees Centigrade, which will decrease at a rate of from about 1 to about 4 millivolts per degree Centigrade as the temperature increases above 25 degrees Centigrade, and which will increase at a rate of from about 1 to about 4 millivolts per degree Centigrade as the temperature decreases below 25 degrees Centigrade. It is preferred that the rate of increase or decrease be about 1.6 millivolts per degree Centigrade. This feature is provided in the devices of FIGS. 1, 2, 3, 4, 8, and 9 (by the forward voltage temperature coefficient of diodes 58 and 60), and in FIGS. 5, 6, and 7 (by the forward voltage temperature coefficients of diodes 234, 236, and the base emitter voltage of transistor 240).

Applicant's battery charger also is comprised of means for individually limiting the voltage which each cell may be charged to to a direct current voltage at 25 degrees Centigrade within the range of from about 1.6 to about 1.7 volts; this maximum voltage, as described above, is preferably negatively temperature compensated so that it will vary from about 1 to about 4 millivolts per degree centigrade it changes from 25 degrees Centigrade. Thus, e.g., this feature is provided as described above; by varying the reference voltage, one varies the maximum cell voltage.

Applicant's battery charger is also comprised of means for individually limiting the current applied to each cell being charged to a current of less than 800 milliamperes, provided that the current also is less than the amount defined by the following formula: $I_{max}=(1.7 \text{ volts}-V_r)/R_i$. $I_{max}$ is the maximum allowed charging current, which always is less than 800 milliamperes, but may be even lower. $V_r$ is the reference voltage, and it equal to the maximum allowed cell voltage described above; it generally is from about 1.6 to about 1.7 volts at 25 degrees centigrade, which value is preferably negatively temperature compensated as described above. $R_i$ is the internal resistance of the cell being charged. As is known to those skilled the art, the internal resistance of a cell can be measured by a standard digital voltmeter and is equal to the ratio of the change in cell voltage divided by the current of a step load applied to that cell. For AA size alkaline cells, the test for internal resistance typically involves the connection of a 10 ohm load to an unloaded cell.

In one preferred embodiment, the applicant's charger is comprised of means for limiting the current applied to each cell being charged to a current of less than 300 milliamperes. In another embodiment, the current applied to each cell is limited to a maximum of 200 milliamperes. In yet another embodiment, the current applied to each cell is limited to a maximum of 170 milliamperes.

This feature of applicant's device is illustrated in FIGS. 1, 2, 3, 4, 8, and 9 (by selecting the value of resistor 40), in FIG. 5 (by selecting the value of resistor 254), and in FIGS. 6 and 7 (by selecting the value of resistor 270 and the adjustment of the reference voltage from resistor 64).

Applicant's device also is comprised of means for individually and continually varying the current applied to each cell. As will be apparent to those skilled in the art, the fact that applicant's charger individually and continuously adjusts the current applied to each cell means that, at least during a portion of the charging cycle for any particular cell, the current supplied to any one cell will differ from the current supplied to any other cell. This feature allows the simultaneous recharging of cells with substantially different capacities and/or initial states of charge without depending on any recombinant current absorption capacity by the cell. This feature allows each cell to be charged to its capacity without requiring any current through this or any other cell beyond that required to charge such cell to its capacity.

This means for individually and continuously varying the current applied to each cell is illustrated in FIGS. 1, 2, 3, 4, and 8 (see comparator 34 which controls the charging current to that cell only), in FIGS. 5, 6, and 7 (each shunt regulator 256 limits the voltage to its associated battery 258 only), and in FIG. 9 (comparator 34 limits the voltage available to any and all cells).

Most of the prior art battery chargers of which applicant is aware contain means for providing small charging current to the cells being charged even after such cells have reached their desired voltage, at "high charge cutoff." This "trickle current" has two functions. In the first place, it compensates for "local currents" or "self-discharge currents" within the cell and, thus, provides capacity maintenance. In the second place, it slowly completes charging to 100 percent of capacity of each and every cell despite capacity variations between cells, by depending on the recombinant absorption capacity of those cells subject to this current but already at a sufficient state of charge to not significantly absorb the current.

In applicant's device, by comparison, after any particular cell being charged has reached its final permitted voltage, additional current will only be provided as and when required to maintain that voltage. Means are provided for individually and independently reducing the current flow to zero when the cell has reached its desired voltage.

In one embodiment, the desired voltage of the cell being charged is from about 1.625 to about 1.630 volt, at 25 degrees Centigrade.

It will be apparent to those skilled in the art that, for certain specific applications, modifications of the basic designs may be advantageous.

By way of illustration, in one embodiment the rate of capacity restoration relatively early in the charging cycle is enchanced by the application of short, relatively high reverse current pulses. See, e.g., FIGS. 1, 2, and 7.

Furthermore, alternatively, or additionally, one may improve the ability of the cell to recover from excessive discharge or storage in a discharge state, especially on the first recharge cycle. This characteristic can be somewhat improved by the application of rare, wide, relatively low current discharge pulses, as additionally provided in FIGS. 1, 2, and 7.

As is illustrated in FIG. 8, one may trade recharge time for prolonged survival under continuous charging conditions is provided for potential standby applications.

Battery charger with a cell status display

Figure 10:
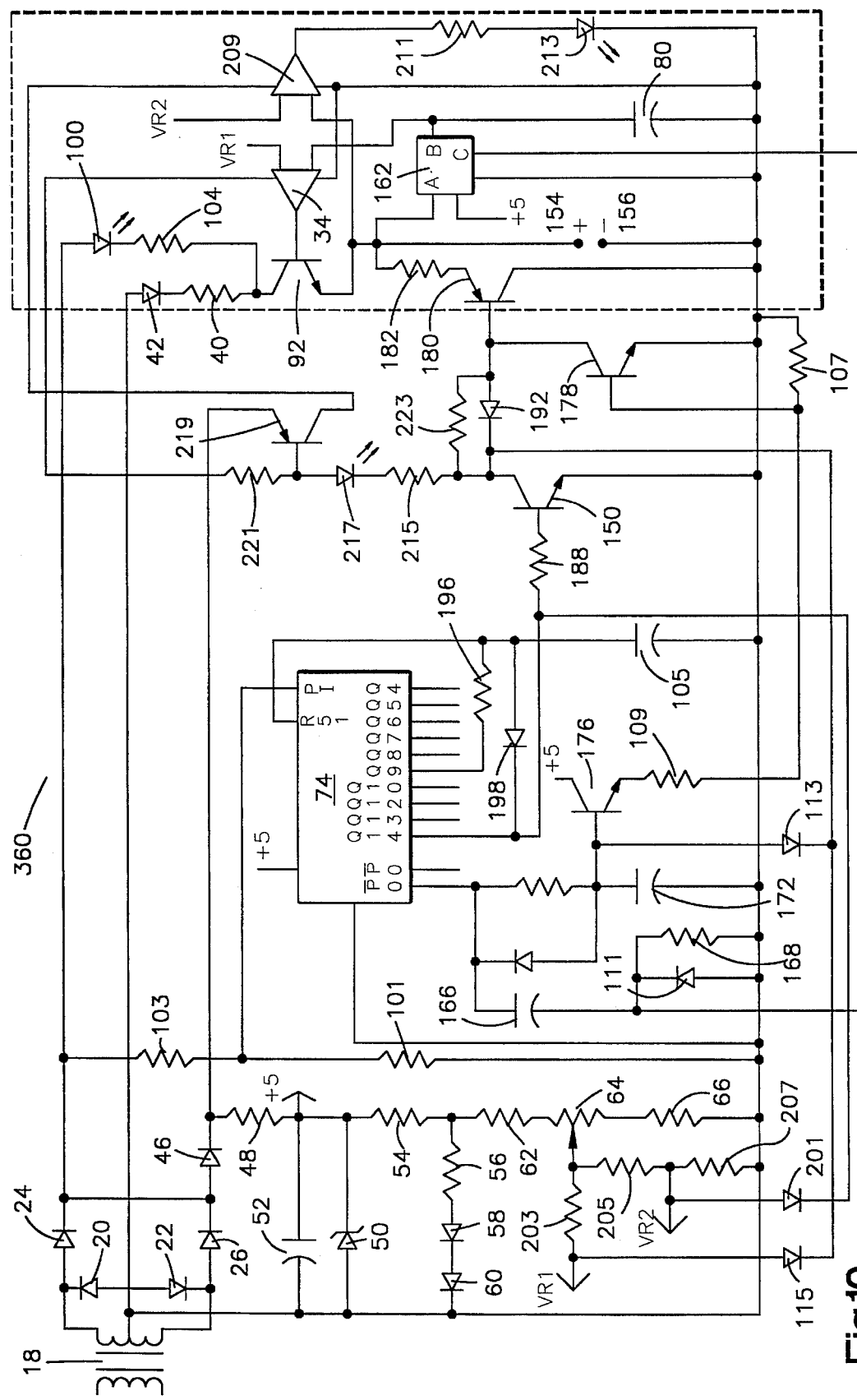
FIG. 10 is a schematic of another preferred battery charger within the scope of this invention.

FIG. 10 illustrates a battery charger 360 with a cell status display. Many of the elements of the battery charger 360 of this Figure are identical in value and function to the battery chargers depicted in FIGS. 1 and 2; and such common elements are numbered identically to the manner they are numbered in FIGS. 1 and 2. However, additionally, the battery charger of FIG. 10 also contains additional components 201 et seq. which are identified by odd numbers appearing between 201 and 223. These additional components, and their functions, will be described below, it being understood that the functions of the other components of charger 360 are not modified by these new components.

Referring to FIG. 10, it will be seen that resistors 205 and 207 provide a new, additional reference voltage ("$V_{r2}$) lower than the original reference voltage (now designated $V_{r1}$ and isolated by resistor 203. This reference voltage $V_{r2}$ is applied to the non-inverting input (for each cell) of an additional voltage comparator 209 (which may be identical to the comparator selected as comparator 34), the inverting input of which is connected to the positive terminal of the individual cell being charged (not shown).

Transistor 150 provides the control for transistor 180 for the long pulse (about once a minute discharge) and the inputs to diodes 113, 115 and, additionally, 201. In this embodiment, transistor 150 also is employed to illuminate light emitting diode 217 through current control resistor 215. As will be apparent to those skilled in the art, when such light emitting diode 217 is activated, the indicated that the cell has been withdrawn from recharge and is being actively discharged.

Referring again to FIG. 10, resistor 223 provides back bias to transistor 180 to insure turn off when neither transistor 150 or 178 is conducting. The current through elements 215 and 217 provides the input to the base of PNP transistor 219 (the base-emitter junction of which is positively turned off by the resistor 221); transistor 219, e.g., may be a type 2N4403 or a similar device. The collector of transistor 219 provides the input power to the comparators 209 (one per cell). Thus, comparator 209 will operate only during the long pulse interval. During such interval, should the cell under test (under discharge load) reach a voltage below $V_{r2}$, comparator 209 will illuminate light emitting diode 213 through current control resistor 211.

Thus, light emitting diode 213 will inform a user approximately once per minute of the capacity of the cell under test to sustain a load voltage above $V_{r2}$. Therefore, by the selection of the value of $V_{r2}$ for a given test current and duration, the quality of the cell under test at any stage of the charging process may be displayed. By selecting $V_{r2}$ appropriately (1.530 volts provides a cosmetically appealing display), the performance of the cell required to pass the test within a short time after the initiation of recharge (often within about 15–60 minutes) may be displayed. This device thus provides the user with the ability to determine early in the cell recharge cycle whether the cell under recharge will in fact adequately recharge and enables such to avoid prolonged, unsuccessful committment of charger capacity early in the charging cycle; and the display clearly inidicates, when appropriate, that unsuccessful charging may be caused by the cell rather than the charger.

The following examples are presented to illustrate the claimed invention but are not to be deemed limitative thereof. Unless otherwise specified, all parts are by weight, and all temperatures are in degrees centigrade.

EXAMPLE 1

The charger circuit of FIG. 1 was used to recharge a pair of AA Duracell alkaline batteries 1.5 volt batteries. These batteries were discharged using a 10-ohm load until 1.4 ampere-hours had been withdrawn from each of them. Thereafter, using the circuit of FIG. 1, they were charged independently with a maximum current of 200 milliamperes, a discharge current of 40 milliamperes, a discharge duration of 2 milliseconds out of each 8.33 millisecond interval, and a long pulse discharge of 2.0 seconds per every 30 seconds.

The batteries were recharged for 18 hours and then allowed to stand for 48 hours. Thereafter, they were discharged in series with a 10-ohm load a second time to a total of 1.0 ampere-hour removed capacity and a final voltage of 0.9 volts per cell. Then the batteries were recharged for 16 hours (using a voltage reference of 1.582 volts), and then they were discharged under the above conditions.

In the third cycle, 1.3 ampere hours were removed to a final combined voltage of 1.9 volts. The batteries were recharged using the conditions used in cycle two, and they then were discharged again, providing 1.1 ampere hours, to a final voltage of 1.8 volts. Recharge was repeated, but the reference voltage was moved to 1.585 volts.

In discharge number 5, the conditions described were used, but only 950 milliamperes hours were provided to a cutoff of 1.8 volts. Recharge was again conducted using a reference voltage of 1.585 volts. Discharge occurred as described above, but only 925 milliamperes hours were provided to a cutoff of 1.80 volts.

At this point, it was apparent that the reference voltage was too low. Thus, the reference voltage was raised to 1.60 volts, and the cells were parked for 90 hours on charge to reach equilibrium. The next discharge (cycle seven) yielded 1.18 ampere hours, and recharge was repeated at 1.615 reference volts for 20 hours.

The next discharge yielded only 925 milliamperes hours, to a cutoff voltage of 1.8 volts; and the reference voltage was raised to 1.63 volts for 20 hours recharge.

In cycle 9, only 900 milliamperes hours were produced. The cells were returned to recharge at 1.630 volts for 72 hours.

It should be noted that, despite the fact that the capacity of these cells clearly declined, this is a singularly brutal test, since essentially all of the available capacity is being withdrawn each cycle, and the rechargeable capacity of a primary cell is only about 67 percent of its primary capacity. The early apparent excess capacity was probably provided by additional irreversible primary discharge. If the expected capacity of a 1.5 ampere-hour cell is nominally 1.0 ampere hour as a rechargeable, and one is still able to extract 90 percent of that capacity on the ninth recharge—discharge cycle, clearly something effective is happening.

EXAMPLE 2

The procedure of Example 1 was substantially repeated with Duracell, AA 1.5 ampere-hour alkaline batteries, which were subjected to complex and varying test sequences.

Initial discharge was conducted with a ten-ohm resistor, and only 675 milliamperes hours (about one-half of nominal capacity) were withdrawn with an end-terminal voltage of 1.25 volts. The battery was recharged for 20 hours at 1.582 volts direct current with a current limit of 150 milliamperes.

In the second discharge cycle, using the conditions described above, 600 milliamperes hours were withdrawn to an end voltage of 1.212 volts, and recharge was repeated as described above.

In the third cycle, using the conditions described above, 600 milliamperes hours were again withdrawn to an end voltage of 1.223 volts, and recharge was repeated as described above.

The fourth cycle was identical to the third, but the end voltage 1.189. The fifth cycle was substantially identical to the fourth, but the end voltage was 1.219 volts; and, in this cycle, recharge was continued for 72 hours.

It had become clear that shallow discharge and cautious recharge were not providing a significant aging rate. Thus, conditions were changed drastically.

In cycle six, the discharge produced 600 milliamperes hours to an end voltage of 1.294 volts, and the load was allowed to remain connected for an additional 20 hours to a deep discharge end voltage of 0.078 volts direct current. The cell was then recharged for 24 hours using the conditions described above.

The seventh discharge cycle produced only 650 milliamperes hours to an end voltage of 0.90 volts. The observed capacity of the cell had been reduced to less than half of its nominal value.

The cell was then recharged, as described above. Then it was connected to the charging device shown in FIG. 1 and utilized in Example 1; and it was allowed to charge for an additional 24 hours.

Discharge cycle eight was then run with a 5.0 ohm load (a more severe discharge, but equal in severity to the discharge conditions used in Example 1). Discharge cycle eight yielded 1.0 ampere-hours to an end point of 0.9 volts. Substantially most of the battery capacity had been reclaimed with a single pulsed discharge period.

Following discharge number eight, the battery was returned to straight direct current charging, substantially as described above, with the exception that the charging voltage used was 1.60 volts. The battery was charged for 72 hours.

In discharge cycle 9, the procedure of discharge cycle 8 were substantially repeated; and 1.1 ampere hours were delivered to an end voltage of 0.918 volts. The recharge voltage was raised to 1.615 volts, and recharging occurred for 36 hours.

In discharge cycle number 10, only 900 milliamperes hours were provided, to a 0.9 volts cutoff. Recharge was at 1.630 volts, for 20 hours.

In discharge cycle 11, the conditions of cycles 8, 9, and 10 were used for discharge. Only 650 milliamperes hours were available to a cutoff of 0.9 volts.

It appears from this data that direct current recharging does not conserve cell capacity in the face of cyclic deep discharge.

EXAMPLE 3

In this Example, the procedure of Example 1 was substantially followed with two elderly RAM (rechartable alkaline manganese) cells. These cells were initially obtained from the Battery Technology Inc. company of Mississauga, Ontario, Canada. They were aged using different regimens. One of the cells was heavily discharged and then stored for 30 days. The other cell was stored in a charged condition for 30 days.

Initially, each of these cells was charged using 1.65 volts direct current pulses for 48 hours; the pulses were on for about six milliseconds, and off for about 2 milliseconds.

The initial capacity of these cells, under a 10-ohm load, was 650 milliampere hours for the discharged storage cell (the "sleepy cell"), and it was 870 milliampere hours for the normal RAM cell.

Each of these cells were simultaneously recharged for 20 hours in the apparatus of FIG. 1, using the conditions described in Example 1, with the exception that the reference voltage used was 1.65 volts.

In a second cycle, the cells were discharged as described above; they were taken down to 840 and 870 milliampere hours for the sleepy cell and the normal cell, respectively, to end voltages of 1.10 and 1.15 volts, respectively. These cells were then recharged to 20 hours in accordance with the pulse procedure described above.

The cells were discharged as described above, and they provided only 600 and 650 milliampere hours to cutoff voltages of 0.929 and 1.005 volts, respectively. It was believed that a prolonged power outage occurred during this recharging cycle.

Recharge was repeated for 72 hours, in accordance with the pulse procedure described above. The cells were then totally discharged for 24 hours with 10-ohm resistors to well below 0.1 volts per cell.

The cells were then recharged for 48 hours using the charger of FIG. 1. The next discharge was run with 5-ohm resistors, providing a severe test. The sleepy cell provided 1.1 ampere hours to a cutoff voltage of 0.94 volts; the normal cell provided only 0.9 ampere hours to a cutoff voltage of 0.83 volts.

It appears that the normal cell, which had a long cyclic history, was finally suffering irreversible capacity decline. The sleepy cell, which had fewer cycles in its history, recovered quite well under in the dual pulse environment.

EXAMPLE 4

In these Examples, various alkaline cells were tested under varying conditions. In the tests presented in Table 1, AA alkaline cells sold by the Eastman Kodak Company of Rochester, N.Y. were recharged with the battery charger depicted in FIG. 2. The results of this Example are presented in Table 1, which presents the discharge capacity for each of the four cells tested for the twenty-two cycles under the conditions specified in Table 1. The test conditions were the load (in ohms), the recharge time per cycle per cell (in hours), the discharge stand time (the time between the end of discharge and the beginning of recharge), in hours, the charge stand time (the time between the end of charge and the commencement of discharge), in days, the charge mode, and the recharge voltage cutoff limit (in volts).

In the tests presented in Table 2, a different group of older, mercury containing Kodak AA cells were tested under slightly different conditions as specified for sixteen cycles.

In the tests presented in Table 3, a group of Ray-O-Vac AA alkaline cells were tested as specified for ten cycles.

In the tests presented in Table 4, a group of Fuji low mercury AA cells were tested as specified.

In the tests presented in Table 5, a group of low mercury RAM (rechargeable alkaline manganese) cells from Battery Technologies Incorporated were tested as specified.

TABLE 1

| CYCLE | CAP. AH CELL # | | | | LOAD | RECHG TIME | DISCHG STAND TIME | CHG STAND TIME | CHG | RECHG VOLT | |
|---|---|---|---|---|---|---|---|---|---|---|---|
| # | 1 | 2 | 3 | 4 | OHMS | (HR.) | DAYS | DAYS | MODE | LIMIT | REMARKS |
| 1 | 1.1 | 1.2 | 1.2 | 1.1 | 10 | 18 | 0 | 0 | FIG. 2 | 1.635 | KODAK AA CELLS BOUGHT |
| 2 | 1.0 | .95 | 1.0 | .95 | 10 | 18 | 0 | 0 | | 1.635 | RETAIL NO SPECIAL HISTORY |
| 3 | .9 | .8 | .8 | .9 | 10 | 18 | 0 | 0 | | 1.635 | "MERCURY FREE" |
| 4 | .85 | .8 | .8 | .85 | 10 | 18 | 0 | 0 | | 1.635 | |
| 5 | .82 | .7 | .75 | .75 | 10 | 18 | 0 | 0 | | 1.635 | |
| 6 | .8 | .6 | .7 | .7 | 10 | 18 | 0 | 0 | | 1.635 | |
| 7 | .8 | .6 | .75 | .65 | 10 | 18 | 0 | 0 | | 1.635 | INITIAL CAPACITY |
| 8 | .8 | .58 | .7 | .7 | 10 | 18 | 0 | 0 | | 1.635 | 2AH (CYCLE 0) |
| 9 | .8 | .58 | .7 | .65 | 10 | 18 | 0 | 0 | | 1.635 | 2AH CUT-OFF VOLTAGE 0.9 VDC |
| 10 | .8 | .58 | .75 | .7 | 10 | 18 | 0 | 0 | | 1.635 | |
| 12 | .72 | .55 | .65 | .65 | 10 | 18 | 0 | 0 | | 1.635 | |
| 14 | .6 | .51 | .55 | .55 | 10 | 18 | 0 | 0 | | 1.635 | |
| 16 | .55 | .45 | .55 | .50 | 10 | 18 | 0 | 0 | | 1.635 | |
| 18 | .50 | .42 | .45 | .45 | 10 | 18 | 0 | 0 | | 1.635 | |
| 20 | .45 | .40 | .42 | .42 | 10 | 18 | 0 | 0 | | 1.635 | |
| 22 | .42 | .40 | .40 | .41 | 10 | | 0 | 0 | | | |

TABLE 2

| CYCLE | CAP. MAH CELL # | | | | LOAD | RECHG TIME | DISCHG STAND TIME | CHG STAND TIME | CHG | RECHG VOLT | |
|---|---|---|---|---|---|---|---|---|---|---|---|
| # | 1 | 2 | 3 | 4 | OHMS | (HR.) | DAYS | DAYS | MODE | LIMIT | REMARKS |
| 1 | 1700 | 1700 | 1700 | 1700 | 5 | 18 | 0 | 0 | FIG. 3 | 1.650 | KODAK AA - OLDER TYPE |
| 2 | 1450 | 1450 | 1450 | 1450 | 5 | 18 | 0 | 0 | | 1.650 | ORRIGINAL MERCURY CONTENT |
| 3 | 1200 | 1200 | 1200 | 1200 | 5 | 18 | 0 | 0 | | 1.650 | CUT-OFF 0.9 VDC |
| 4 | 1150 | 1100 | 1150 | 1150 | 5 | 18 | 0 | 0 | | 1.650 | |
| 5 | 1100 | 1050 | 1050 | 1050 | 5 | 68 | 0 | 0 | | 1.650 | TEST EXTENDED CHARGE TIME |

TABLE 2-continued

| CYCLE # | CAP. MAH CELL # | | | | LOAD OHMS | RECHG TIME (HR.) | DISCHG STAND TIME DAYS | CHG STAND TIME DAYS | CHG MODE | RECHG VOLT LIMIT | REMARKS |
|---|---|---|---|---|---|---|---|---|---|---|---|
| | 1 | 2 | 3 | 4 | | | | | | | |
| 6 | 1050 | 950 | 1050 | 1100 | 5 | 18 | 0 | 0 | | 1.650 | EXTRA CHARGE UNIMPORTANT |
| 7 | 940 | 800 | 940 | 930 | 5 | 18 | 0 | 0 | | 1.650 | |
| 8 | 850 | 770 | 800 | 780 | 5 | 18 | 0 | 0 | | 1.650 | |
| 9 | 720 | 670 | 690 | 690 | 5 | 18 | 0 | 0 | | 1.650 | |
| 10 | 650 | 630 | 630 | 630 | 5 | 18 | 0 | 0 | | 1.650 | <TEST EXTANDED CHARGE AGAIN |
| 11 | 585 | 560 | 550 | 560 | 5 | 18 | 0 | 0 | | 1.650 | CAPACITY BELOW NEW NICAD. |
| 12 | 575 | 500 | 515 | 520 | 5 | 18 | 0 | 0 | | 1.650 | |
| 13 | 520 | 510 | 500 | 480 | 5 | 18 | 0 | 0 | | 1.650 | |
| 14 | 470 | 450 | 450 | 470 | 5 | 18 | 0 | 0 | | 1.650 | <INTERNAL RESISTANCE RISING |
| 15 | 450 | 240 | 440 | 400 | 5 | 68 | 0 | 0 | | 1.650 | <LAST TRY WITH EXTRA CHARGE |
| 16 | 420 | 370 | 400 | 380 | 15 | | 0 | 0 | | 1.650 | TIME/STOP |

TABLE 3

| CYCLE # | CAP. MAH CELL # | | | | LOAD OHMS | RECHG TIME (HR.) | DISCHG STAND TIME DAYS | CHG STAND TIME DAYS | CHG MODE | RECHG VOLT LIMIT | REMARKS |
|---|---|---|---|---|---|---|---|---|---|---|---|
| | 5 | 6 | 7 | 8 | | | | | | | |
| 0 | 2150 | 2000 | 2000 | 1950 | 10 | 100 | 0 | 0 | FIG. 4 | 1.650 | RAYOVAC |
| 1 | 1000 | 950 | 975 | 950 | 10 | 18 | 0 | 0 | | 1.650 | <DENDRITE - 40 MA CELL 5 |
| 2 | 900 | 900 | 925 | 900 | 10 | 18 | 0 | 0 | | 1.650 | |
| 3 | 925 | 900 | 925 | 900 | 10 | 18 | 0 | 0 | | 1.650 | |
| 4 | 850 | 900 | 900 | 850 | 10 | 48 | 0 | 0 | | 1.650 | |
| 5 | 950 | 950 | 950 | 950 | 10 | 48 | 0 | 0 | | 1.650 | |
| 6 | 900 | 850 | 850 | 850 | 10 | 18 | 0 | 0 | | 1.650 | CUT-OFF VOLTAGE 0.9 VDC |
| 7 | 800 | 750 | 800 | 800 | 10 | 18 | 0 | 0 | | 1.650 | |
| 8 | 750 | 750 | 750 | 800 | 10 | 18 | 0 | 0 | | 1.650 | |
| 9 | 650 | 700 | 700 | 700 | 10 | 18 | 0 | 0 | | 1.650 | |
| 10 | 600 | 650 | 600 | 650 | 10 | | 0 | 0 | | | <DENDRITES ALL CELLS 40/80 MA |

TABLE 4

| CYCLE # | CAP. MAH CELL # | | | | LOAD OHMS | RECHG TIME (HR.) | DISCHG STAND TIME DAYS | CHG STAND TIME DAYS | CHG MODE | RECHG VOLT LIMIT | REMARKS |
|---|---|---|---|---|---|---|---|---|---|---|---|
| | 1 | 2 | 3 | 4 | | | | | | | |
| 0 | 1900 | 1900 | 1850 | 1850 | 10 | 160 | 0 | 0 | FIG. 6 | 1.620 | FUJI LOW MERCURY |
| 1 | 1000 | 1000 | 775 | 775 | 10 | 40 | 0 | 0 | | 1.620 | |
| 2 | 800 | 800 | 700 | 700 | 10 | 40 | 0 | 0 | | 1.620 | CUT-OFF VOLTAGE 0.9 VDC |
| 3 | 775 | 775 | 675 | 675 | 10 | 40 | 0 | 0 | | 1.620 | |
| 4 | 750 | 750 | 675 | 675 | 10 | 40 | 0 | 0 | | 1.620 | TYPICAL OEM APPLICA- |
| 5 | 725 | 700 | 675 | 650 | 10 | 40 | 0 | 0 | | 1.620 | TION WHERE UNIT IS USED |
| 6 | 700 | 600 | 575 | 575 | 10 | 40 | 0 | 0 | | 1.620 | THEN PLACED ON CHARGE |
| 7 | 650 | 600 | 550 | 550 | 10 | 40 | 0 | 0 | | 1.620 | AND LEFT ON CHARGE |
| 8 | 625 | 625 | 550 | 500 | 10 | 40 | 0 | 0 | | 1.620 | BETWEEN USE EVENTS. |
| 9 | 600 | 600 | 625 | 575 | 10 | | 0 | 0 | | | |

TABLE 5

| CYCLE # | CAP. MAH CELL # | | | | LOAD OHMS | RECHG TIME (HR.) | DISCHG STAND TIME DAYS | CHG STAND TIME DAYS | CHG MODE | RECHG VOLT LIMIT | REMARKS |
|---|---|---|---|---|---|---|---|---|---|---|---|
| | 1 | 2 | 3 | 4 | | | | | | | |
| 0 | 1500 | 1400 | 1500 | 1400 | 10 | 36 | 0 | 0 | FIG. 8 | 1.610 | BTI "RECHARGEABLE" |
| 1 | 1200 | 1050 | 1300 | 1200 | 10 | 36 | 0 | 0 | | 1.610 | NEW LOW MERCURY TYPE CELL. |
| 2 | 1200 | 1050 | 1150 | 1100 | 10 | 36 | 0 | 0 | | 1.610 | CUT-OFF 0.9 VDC FLOAT |
| 3 | 1150 | 1000 | 1150 | 900 | 10 | 36 | 0 | 0 | | 1.610 | SERVICE TEST FOR OEM |
| 4 | 1050 | 900 | 1050 | 900 | 10 | 36 | 0 | 0 | | 1.610 | "BUILT-IN" APPLICATIONS |
| 5 | 1000 | 800 | 1000 | 800 | 10 | 36 | 0 | 0 | | 1.610 | WHERE DEPTH OF |
| 6 | 950 | 775 | 1000 | 800 | 10 | 36 | 0 | 0 | | 1.610 | DISCHARGE, RECHARGE |
| 7 | 900 | 775 | 950 | 750 | 10 | 36 | 0 | 0 | | 1.610 | RATE, FLOAT VOLTAGE, |
| 8 | 850 | 750 | 950 | 800 | 10 | 36 | 0 | 0 | | 1.610 | T.C. ETC ARE ALL |
| 9 | 800 | 700 | 950 | 700 | 10 | 36 | 0 | 0 | | 1.610 | DESIGNED IN. |
| 10 | 750 | 650 | 950 | 650 | 10 | 36 | 0 | 0 | | 1.610 | |
| 12 | 600 | 650 | 850 | 650 | 10 | 36 | 0 | 0 | | 1.610 | |
| 14 | 600 | 600 | 800 | 600 | 10 | 36 | 0 | 0 | | 1.610 | |
| 16 | 600 | 550 | 750 | 600 | 10 | 36 | 0 | 0 | | 1.610 | |
| 18 | 550 | 550 | 750 | 575 | 10 | 36 | 0 | 0 | | 1.610 | |
| 20 | 600 | 500 | 650 | 600 | 10 | | 0 | 0 | | | |

COMPARATIVE EXAMPLE 5

An adjustable laboratory power supply was used to test a multiplicity of AA alkaline cells, which were observed while submerged in oil. In the experiment of this example, AA alkaline cells manufactured by the Fuji Electrochemical Company, the Duracell Company, the Ralston-Purina Company (which manufactures the "Energizer" battery), the Mitsushita Company (which manufactures the Panasonic and the Eastman Kodak batteries), the Rayovac Company, and the Toshiba Company were tested; all of the batteries so tested were purchased new at retail. Eight cells from each such manufacturing source were tested in the experiment of this Example.

One set of these batteries were charged in their new cell condition at a constant current of 100 milliamperes. After about 40 minutes, the cell voltage of these batteries rose from 1.58 volts to 1.67 volts. Thereafter, the voltage rose slowly, and the end seals of the cells began to release gas bubbles. The Duracell batteries showed gas escape first; the Rayovac batteries were the last to show gas escape.

Charging of the AA batteries in this manner continued for 24 hours. Gas evolution from the batteries remained stable for about 2 hours; thereafter, large single bubbles appeared intermittently accompanied by significant quantities of granular zinc, which collected in the oil under the cells.

After 24 hours of charging, the cells were removed and tested. Short-circuit current was abnormally low (on the order of from about 200 to about 1,000 milliamperes), and the cells were still capable of significant discharge capacity, ranging from 100 to 600 milliampere hours.

When these cells were recharged with the battery charger depicted in FIG. 2 of this specification, they were capable of accepting charge; but they showed large leakage on a one-month stand test. After two months of standing, they were discharged and recharged using the charger of FIG. 2 for 18 hours; and they showed unpredictable capacity which varied from cell to cell, even from the same manufacturer.

A new alkaline primary cell is manufactured with approximately 150 percent of its rechargeable capacity. One constant current charge event will render this cell unacceptable and unreclaimable by even the most sophisticated charging process. While the cell is still capable of manipulation, it is no longer useful in the ordinary sense.

COMPARATIVE EXAMPLE 6

The procedure of Example 5 was substantially followed, with the exception that the constant current charge used was 200 milliamperes. The cells took 20 minutes for the initial voltage rise from 1.58 to 1.67 volts, but thereafter they also showed evidence of gas escape in the same order as found in the experiment of Example 1.

The gas evolution in this Example was substantially more pronounced than that experienced in the experiment of Example 5, and large bubbles and zinc expulsion occurred as early as 1.0 hour of charging. The batteries of this test were damaged to at least the same extent as the batteries of Example 5 and were effectively rendered useless.

COMPARATIVE EXAMPLE 7

The procedure of Example 5 was substantially repeated, with the exception that the cells tested were initially discharged to 0.9 volts with a 10.0 ohm load.

In this experiment, gas release commenced after about 1.5 ampere hours of charging (15 hours). Large bubbles were never observed, and little zinc was ever ejected. The cells so charged provided a fairly uniform capacity of about 700 milliampere hours. The cells, upon storage for one month, leaked and showed a further 50 percent loss of capacity upon two months storage. However, after such two months of storage, when the cells were charged with the dual reverse pulse charger of FIG. 2 of this specification, seventy percent of the expected capacity could be restored.

Constant current charging, even from a discharged state, damages cell seals and causes permanent leaks. Despite this, cells can be cycled on the charger of this invention. Repeated constant current charging, however, reduces capacity rapidly.

COMPARATIVE EXAMPLE 8

The procedure of Example 6 was substantially repeated, with the exception that the cells were initially discharged to 0.9 volts with a 10 ohm load. Gas evolution appeared on the first constant current recharge at 1.5 ampere hours (7.5 hours of charging). Gas evolution in this experiment was significantly larger than that experienced in the experiment of Example 7; and about 50% of the expected capacity was lost. One month storage produced substantial leakage; and two months storage produced an additional 50 percent loss in capacity. The use of the double pulse charger of FIG. 2 with cells stored for two months only recovered 50 percent of the expected capacity. Repeated constant current charging at the 200 milliampere level is clearly inappropriate.

COMPARATIVE EXAMPLE 9

The procedure of Example 7 was substantially followed, with the exception that the cell was recharged to 1.625 volts with the bench power supply at 150 milliamperes maximum for 18 hours prior to the time it was subjected to the constant current charging of 100 milliamperes. The recharged cells had properties which were substantially similar to the recharged cells of Example 7, but they were somewhat inferior thereto.

COMPARATIVE EXAMPLE 10

The procedure of Example 9 was substantially followed, with the exception that the constant current charging occurred at 200 milliamperes. The recharged cells had properties similar to those obtained in the experiment of Example 8, but they were somewhat inferior thereto.

Constant current charging of alkaline cells beyond 100 percent capacity, even for only one time, produces irreversible and unacceptable cell damage.

COMPARATIVE EXAMPLE 11

In this experiment of this Example, a series of 9-volt batteries from the battery manufacturers described in Example 5 were purchased new at retail. Four 9 volt batteries from each manufacturer were tested. Each such battery was discharged to 5.4 volts with a 33.0 ohm load. Thereafter, the discharged batteries were recharged at 25 degrees Centigrade to 9.75 volts at a maximum current of 50 milliamperes using the power supply described above; and they were held on charge for 18.0 hours.

This procedure was repeated wherever and whenever it was possible. More than half of the batteries tested produced no output and the end of the first 18 hour recharge. Examination of the internal cells of these failed batteries revealed, in each instance, one or more cells with ruptured end seals and substantial material extrusion.

The batteries which exhibited some degree of output at the end of the first 18 hour recharge had a capacity of from about 50 to about 200 milliampere hours. These batteries were again charged for 18 hours under the same conditions, being first discharged to 5.4 volts and then charged as above with 50 milliamperes max for 18 hours. More than half of the batteries subjected to this second charge cycle failed in the manner described above.

COMPARATIVE EXAMPLE 12

The procedure of Example 11 was substantially repeated, with the exception that the batteries were recharged to a maximum voltage of 9.63 volts at 25 degrees Centigrade, and were charged for 24 hours under these conditions. The initial catastrophic failure of the batteries in the experiment of this Example was reduced to 25 percent after the first charging step. The capacity of the batteries which survived the first charging step was generally about 250 milliampere hours; however, random members of the surviving batteries exhibited significantly lower capacities, on the order of 150 millimapere hours or less.

The batteries which survived the first recharge step where then subjected to a second cycle of discharge and recharge. Each of the batteries which had exhibited a capacity of 150 milliampere hours or less failed in this second cycle, and about 25 percent of the remaining batteries also failed.

The surviving batteries were subjected to a third cycle, and those which survived were subjected to a fourth cycle and a fifth cycle. Average survival was three cycles; and there were no survivors at five cycles.

Mechanically obvious seal failure was evident on most of the cells on disassembly of the failed batteries. Cells not obviously damaged were separated and recharged individually with the battery charger of FIG. 2 of this specification; and then they were stored for one month at room temperature Cell capacity declined dramatically in more than half of the surviving cells and was not recoverable by subsequent discharge and recharge.

COMPARATIVE EXAMPLE 13

The procedure of Example 12 was substantially repeated, with the exception that J batteries (four cell versions of the 6-cell 9.0 volt batteries) were used. The voltage limit was 6.42 volts direct current.

The failure rate was noticeably reduced, presumably due to the lower number of cells in series; but the results obtained were not even remotely acceptable.

COMPARATIVE EXAMPLE 14

The procedure of Example 13 was substantially repeated for groups of four individual AA alkaline cells. In each case, each group of four cells was from the same manufacturer and the same lot. In this experiment, the maximum current used in the recharging was 170 milliamperes.

The results obtained were similar to those obtained in Example 13. Mechanical seal failure and substantial material extrusion was absent. The ejection of a soapy caustic liquid, presumably potassium hydroxide, appeared to represent an equivalent failure mode; and such ejection of caustic liquid occurred in every cell tested after six cycles.

Constant voltage recharging of even short series strings (four) of alkaline cells, even with the voltage limited to 1.605 volts per cell and no current above cutoff, produces unacceptable cell damage. Thus, closed loop, constant voltage battery chargers are inappropriate for charging alkaline cells without individual cell regulation.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

Thus, by way of illustration, the battery charger of this invention, in addition to being useful for recharging zinc/manganese dioxide alkaline cells (primary or rechargeable), also is capable or recharging nickel—cadmium cells efficiently and without damages. Furthermore, such battery charger also may be used to recharge conventional zinc—manganese dioxide dry cells; in such latter application, is preferred to limit the charging time to no more than about 4 hours for an AA cell and, proportionately more or less for other cells of different capacity.

Thus, for example, it will be apparent to those skilled in the art that the parameters of applicant's battery charger are based upon the materials, construction, and chemistry of alkaline cells currently in use today. If such materials and/or construction and/or chemistry changes, it is apparent that such parameters also will be affected. Such new parameters are within the spirit and scope of this invention.

I claim:

1. A battery charger for charging alkaline zinc/manganese dioxide cells, wherein said battery charger comprises:
   (a) means for producing a direct current voltage of from 1.6 to 1.7 volts;
   (b) means for individually and independently limiting the voltage delivered by said battery charger to each of said cells to said voltage of from 1.6 to 1.7 volts at cell temperatures of 25 degrees centigrade;
   (c) means for individually and independently limiting the current applied to each of said cells by said battery charger;
   (d) means for individually and continuously varying current applied to each of said cells by said battery charger, wherein during a portion of the charging cycle for each of said cells, said current supplied to any one of said cells differs from the current supplied to any other of said cells; and
   (e) means for reducing the current applied to any of said cells when any of said cells have reached a cell voltage which is substantially equal to said direct current voltage; and
   (f) means for measuring the voltage to any one of said zinc—manganese dioxide alkaline cells when any one of said zinc-manganese dioxide alkaline cells is connected to a fixed load and allowed to discharge across said fixed load.

2. The battery charger as recited in claim 1, wherein said means for measuring the voltage to any one of said zinc—manganese dioxide alkaline cells further comprises a comparator electrically connected to any one of said zinc-manganese dioxide alkaline cells.

3. The battery charger as recited in claim 2, wherein said means for measuring the voltage of any one of said zinc—manganese dioxide alkaline cells further comprises a means for generating a test reference voltage which is electrically connected to said comparator.

4. The battery charger as recited in claim 3, wherein said battery charger is comprised of a first display which is electrically connected to said comparator and which is activated whenever said cell voltage is less than said test reference voltage when any one of said zinc-manganese dioxide alkaline cells is connected to said fixed load and allowed to discharge across said fixed load.

5. The battery charger as recited in claim 4, wherein said battery charger is comprised of a second display adapted to indicate when any one of said zinc-manganese dioxide alkaline cells is no longer being charged by said battery charger and is being discharged by said fixed load.

6. A battery charger for charging alkaline zinc/manganese dioxide cells, wherein said battery charger comprises:
   (a) means for producing a direct current voltage of from 1.6 to 1.7 volts;
   (b) means for individually and independently limiting the voltage delivered by said battery charger to each of said cells to said voltage of from 1.6 to 1.7 volts at cell temperatures of 25 degrees centigrade;
   (c) means for individually and independently limiting the current applied to each of said cells by said battery charger;
   (d) means for individually and continuously varying current applied to each of said cells by said battery charger, wherein during a portion of the charging cycle for each of said cells, said current supplied to any one of said cells differs from the current supplied to any other of said cells; and
   (e) means for reducing the current applied to any of said cells when any of said cells have reached a cell voltage which is substantially equal to said direct current voltage; and
   (f) one light emitting diode for each of said zinc-manganese dioxide cells which is adapted to indicate the acceptance of charging current by each of said zinc-manganese dioxide alkaline cells.

* * * * *